United States Patent
Tashiro et al.

(10) Patent No.: US 7,830,772 B2
(45) Date of Patent: Nov. 9, 2010

(54) OBJECTIVE OPTICAL SYSTEM AND OPTICAL INFORMATION RECORDING/REPRODUCING DEVICE HAVING THE SAME

(75) Inventors: Yoshiyuki Tashiro, Kanagawa (JP); Daisuke Koreeda, Saitama (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 229 days.

(21) Appl. No.: 12/194,081

(22) Filed: Aug. 19, 2008

(65) Prior Publication Data

US 2009/0052307 A1 Feb. 26, 2009

(30) Foreign Application Priority Data

Aug. 21, 2007 (JP) .............................. 2007-214399

(51) Int. Cl.
*G11B 7/00* (2006.01)
(52) U.S. Cl. ............................... 369/112.01
(58) Field of Classification Search ............ 369/112.01, 369/112.1, 112.02, 44.23, 44.24, 44.37, 112.08, 369/112.15
See application file for complete search history.

(56) References Cited

U.S. PATENT DOCUMENTS 6,751,021 B2 * 6/2004 Hendriks et al. ............ 359/566
2003/0147148 A1 8/2003 Kubo
2005/0265151 A1 12/2005 Kimura et al.
2006/0023611 A1 2/2006 Wachi et al.
2006/0114796 A1 6/2006 Maruyama et al.
2008/0130465 A1 6/2008 Koreeda et al.

FOREIGN PATENT DOCUMENTS

JP 2006-12394 1/2006
JP 2006-185576 7/2006
JP 2007-122828 5/2007

OTHER PUBLICATIONS

English language Abstract of JP 2006-185576, Jul. 13, 2006.
English language Abstract of JP 2006-12394, Jan. 12, 2006.
English language Abstract of JP 2007-122828, May 17, 2007.
U.S. Appl. No. 12/233,048 to Koreeda et al, filed Sep. 19, 2008.

* cited by examiner

*Primary Examiner*—Nabil Z Hindi
(74) *Attorney, Agent, or Firm*—Greenblum & Bernstein P.L.C.

(57) ABSTRACT

There is provided an objective optical system for an optical information recording/reproducing device. The objective optical system includes an optical element having an annular zone structure on at least one surface. The annular zone structure includes annular zones configured to have at least one step formed, at a boundary between adjacent ones of the annular zones, to extend in a direction of an optical axis. The at least one step is provided to cause a predetermined optical path length difference between a light beam passing through an outside of the boundary and a light beam passing through an inside of the boundary. The predetermined optical path length difference given to a first light beam by the at least one step is approximately equal to an odd multiple of a first wavelength $\lambda a$. Abbe number of material of the optical element satisfies a condition of $15 < vd < 35$.

33 Claims, 12 Drawing Sheets

OBJECTIVE OPTICAL SYSTEM AND OPTICAL INFORMATION RECORDING/REPRODUCING DEVICE HAVING THE SAME

BACKGROUND OF THE INVENTION

The present invention relates to an objective optical system which is installed in a device employing multiple types of light beams having different wavelengths, such as an optical information recording/reproducing device for recording information to and/or reproducing information from multiple types of optical discs differing in recording density.

There exist various standards of optical discs (CD, DVD, etc.) differing in recording density, protective layer thickness, etc. Meanwhile, new-standard optical discs (HD DVD (High-Definition DVD), BD (Blu-ray Disc), etc.), having still higher recording density than DVD, are being brought into practical use in recent years to realize still higher information storage capacity. The protective layer thickness of such a new-standard optical disc is substantially equal to or less than that of DVD. In consideration of user convenience with such optical discs according to multiple standards, the optical information recording/reproducing devices (more specifically, objective optical systems installed in the devices) of recent years are required to have compatibility with the above three types of optical discs. Incidentally, in this specification, the "optical information recording/reproducing devices" include devices for both information reproducing and information recording, devices exclusively for information reproducing, and devices exclusively for information recording. The above "compatibility" means that the optical information recording/reproducing device ensures the information reproducing and/or information recording with no need of component replacement even when the optical disc being used is switched.

In order to provide an optical information recording/reproducing device having the compatibility with optical discs of multiple standards, the device has to be configured to be capable of forming a beam spot suitable for a particular recording density of an optical disc being used, by changing a NA (Numerical Aperture) of an objective optical system used for information reproducing/registering, while also correcting spherical aberration which varies depending on the protective layer thickness changed by switching between optical discs of different standards. Since the diameter of the beam spot can generally be made smaller as the wavelength of the beam gets shorter, multiple laser beams having different wavelengths are selectively used by the optical information recording/reproducing device depending on the recording density of the optical disc being used. For example, for DVDs, a laser beam with a wavelength of approximately 660 nm (so-called red laser light) shorter than approximately 790 nm for CDs is used. For the aforementioned new-standard optical discs, a laser beam with a wavelength still shorter than that for DVDs (e.g. so-called "blue laser" around 408 nm) is used in order to deal with the extra-high recording density.

In recent years, a technology for suitably converging a light beam onto a record surface of an optical disc being used by providing an optical element having an annular zone structure for an objective optical system in an optical information recording/reproducing device has been brought into practical use. More specifically, the annular zone structure formed on a surface of the optical element is configured to have a plurality of annular zones divided by minute steps. Through the function of the annular zone structure, each of the multiple types of light beams having different wavelengths is suitably converged onto the record surface of each of the optical discs of different standards.

Japanese Patent Provisional Publication No. 2006-185576A (hereafter, referred to as JP2006-185576A) discloses an example of an optical information recording/reproducing device having compatibility with optical discs of multiple standards.

In order to perform information recording or information reproducing for an optical disc having a high recording density, the optical information recording/reproducing device is required to form a beam spot having a higher intensity than that for existing optical discs. For this reason, the annular zone structure is designed such that the use efficiency of the blue-laser used for information recording/reproducing for an optical disc having a high recording density is set at a high level. The use efficiency of light means a contribution ratio of the amount of laser light emitted by a light source with respect to the information recording/reproducing. The fact that the use efficiency of light is high means that each optical component in the optical information recording/reproducing device has a high transmissivity.

However, when an annular zone structure designed to give an optical path length difference substantially equal to an odd multiple of the wavelength of the blue laser and to achieve the high use efficiency for the blue laser is used in an objective optical system of the optical information recording/reproducing device, use efficiency of light (i.e., use efficiency of near-infrared laser light) in the information recording/reproducing for CD inevitably decreases.

In order to solve such a problem, an objective optical system disclosed in Japanese Patent Provisional Publication No. 2006-12394A (hereafter, referred to as JP2006-12394A) is configured to have an optical element formed by cementing two types of optical components made of different materials with respect to each other. A diffraction structure is formed on a cementing surface between the two types of components so that the optical element enhances the use efficiency of near-infrared laser light while keeping the diffraction efficiency of blue laser light at a high level.

However, the objective optical system disclosed in JP2006-12394A has a drawback that a process for cementing the two types of optical components has to be additionally processed in the manufacturing process of the objective optical system. In addition, the diffraction structure has to be formed on the cementing surface with extremely high accuracy. Therefore, the manufacturing cost of the objective optical system is high.

Japanese Patent Provisional Publication No. 2007-122828A (hereafter, referred to as JP2007-122828A) discloses an optical pick-up device configured to have a diffraction grating formed by laminating at least two types of elements having different degrees of dispersion together so that high diffraction efficiency can be maintained for both of the blue laser and the near-infrared laser. JP2007-122828A also discloses an optical pick-up device provided with an optical element having a single diffraction surface designed to appropriately select, for each of the blue laser and the near-infrared laser, the diffraction order at which the diffraction efficiency is maximized.

However, in order to manufacture the optical pick-up device having the above described optical pick-up, the manufacturing has to be performed with an extremely high degree of accuracy. Therefore, the manufacturing cost of the optical pick-up disclosed in JP2007-122828A is very high. The optical element having the single diffraction surface disclosed in JP2007-122828A is configured to produce even-order diffracted light for the blue laser. In this case, it becomes difficult to correct the relative spherical aberration caused by switching between an optical disc requiring the blue laser and an optical disc requiring the near-infrared laser.

SUMMARY OF THE INVENTION

The present invention is advantageous in that it provides at least one of an objective optical system and an optical information recording/reproducing device configured to have compatibility with multiple types of optical discs of different standards, to enhance the use efficiency of light for an optical disc (e.g., CD) having a low recording density while keeping the use efficiency of light for optical discs (e.g., BD, HD or DVD) having high recording densities at a high level, and to be manufactured easily at a low cost.

According to an aspect of the invention, there is provided an objective optical system used for an optical information recording/reproducing device for recording information to and/or reproducing information from at least two types of optical discs, by selectively using one of two types of light beams including a first light beam having a first wavelength $\lambda a$ (nm) and a second light beam having a second wavelength $\lambda b$ (nm). The at least two types of optical discs include an optical disc Da for which information recording or information reproducing is executed by using the first light beam and an optical disc Db for which information recording or information reproducing is executed by using the second light beam. The first and second wavelengths $\lambda a$ and $\lambda b$ satisfy a condition of $1.8 < \lambda b/\lambda a < 2.0$. When protective layer thicknesses of the optical discs Da and Db are represented by t1 (mm) and t2 (mm), respectively, the protective layer thicknesses satisfy a condition of ta<tb. When numerical apertures required for information reproducing or information recording on the optical discs Da and Db are defined as NAa and NAb, respectively, the numerical apertures satisfy a relationship NAa>NAb.

In this configuration, the objective optical system includes an optical element configured to have an annular zone structure on at least one surface of the optical element. The annular zone structure including a plurality of annular zones configured to have at least one step formed, at a boundary between adjacent ones of the plurality of annular zones, to extend in a direction of an optical axis of the objective optical system. The at least one step is provided to cause a predetermined optical path length difference between a light beam passing through an outside of the boundary and a light beam passing through an inside of the boundary. The predetermined optical path length difference given to the first light beam by the at least one step is approximately equal to an odd multiple of the first wavelength $\lambda a$. Abbe number of material of the optical element satisfying a condition of $15 < vd < 35$.

With this configuration, it is possible to provide an optical information recording/reproducing device which is able to enhance the use efficiency of light for both of the two types of light beams having the different wavelengths while maintaining the compatibility with the at least two types of optical discs, without the need for complicated manufacturing processes, such as a process for cementing optical components made of different materials together.

In at least one aspect, the predetermined optical path length difference given to the first light beam by the at least one step may be approximately three times as large as the first wavelength $\lambda a$. In this case, the Abbe number of the material of the optical element may satisfy a condition of $15 < vd < 30$.

In at least one aspect, when the predetermined optical path length difference given to the first light beam by the at least one step is represented by $\Delta OPD$ (nm), the optical element may satisfy a condition $2.8 \leq \Delta OPD/\lambda a \leq 3.3$.

In at least one aspect, the predetermined optical path length difference given to the first light beam by the at least one step may be approximately five times as large as the first wavelength $\lambda a$. In this case, the Abbe number of the material of the optical element may satisfy a condition of $15 < vd < 30$.

In at least one aspect, when the predetermined optical path length difference given to the first light beam by the at least one step is represented by $\Delta OPD$ (nm), the optical element may satisfy a condition $4.8 \leq \Delta OPD/\lambda a \leq 5.3$.

In at least one aspect, the predetermined optical path length difference given to the first light beam by the at least one step may be approximately seven times as large as the first wavelength $\lambda a$.

In at least one aspect, when the predetermined optical path length difference given to the first light beam by the at least one step is represented by $\Delta OPD$ (nm), the optical element may satisfy a condition $6.8 \leq \Delta OPD/\lambda a \leq 7.3$.

In at least one aspect, the predetermined optical path length difference given to the first light beam by the at least one step may be approximately nine times as large as the first wavelength $\lambda a$.

In at least one aspect, when the predetermined optical path length difference given to the first light beam by the at least one step is represented by $\Delta OPD$ (nm), the optical element may satisfy a condition $8.8 \leq \Delta OPD/\lambda a \leq 9.3$.

In at least one aspect, the optical element may be configured such that refracting effect of the optical element with respect to the first light beam having the first wavelength $\lambda a$ and an effect given by the annular zone structure cancel with respect to each other to have power of substantially zero with respect to the first light beam having the first wavelength $\lambda a$.

In at least one aspect, the objective optical system may include an objective lens located between the optical element and an optical disc being used. The objective lens converges each of the first and second light beams onto a record surface of corresponding one of the optical discs Da and Db.

In at least one aspect, the optical element may be an objective lens which converges each of the first and second light beams onto a record surface of corresponding one of the optical discs Da and Db.

In at least one aspect, the annular zone structure may be formed in an area securing the numerical aperture NAb required for information recording or information reproducing for the optical disc Db, on the at least one surface of the optical element.

In at least one aspect, each of the first and second light beams may be incident on the objective optical system as a substantially collimated beam.

According to another aspect of the invention, there is provided an optical information recording/reproducing device for recording information to and/or reproducing information from at least two types of optical discs, by selectively using one of two types of light beams including a first light beam having a first wavelength $\lambda a$ (nm) and a second light beam having a second wavelength $\lambda b$ (nm). The optical information recording/reproducing device is provided with light sources respectively emitting the first and the second light beams, and the above described objective optical system.

According to another aspect of the invention, there is provided an objective optical system used for an optical information recording/reproducing device for recording information to and/or reproducing information from at least three types of optical discs, by selectively using one of three types of light beams including a first light beam having a first wavelength $\lambda 1$ (nm), a second light beam having a second wavelength λ2 (nm) and a third light beam having a third wavelength λ3 (nm). The at least three types of optical discs including a first optical disc for which information recording or information reproducing is executed by using the first light beam, a second optical disc for which information recording or information reproducing is executed by using the second light beam, and a third optical disc for which information recording or information reproducing is executed by using the third light beam. The first, second and third wavelengths λ1, λ2 and λ3 satisfying conditions λ1<λ2<λ3, and 1.8<λ3/λ1<2.0. When protective layer thicknesses of the first, second and third optical discs are represented by t1 (mm), t2 (mm) and t3 (mm), respectively, the protective layer thicknesses satisfy a condition of t1≦t2<t3. When numerical apertures required for information reproducing or information recording on the first, second and third optical discs are defined as NA1, NA2 and NA3, respectively, the numerical apertures satisfying following relationships: (NA1>NA3); and (NA2>NA3).

In this configuration, the objective optical system includes an optical element configured to have an annular zone structure on at least one surface of the optical element. The annular zone structure includes a plurality of annular zones configured to have at least one step formed, at a boundary between adjacent ones of the plurality of annular zones, to extend in a direction of an optical axis of the objective optical system. The at least one step is provided to cause a predetermined optical path length difference between a light beam passing through an outside of the boundary and a light beam passing through an inside of the boundary. The predetermined optical path length difference given to the first light beam by the at least one step is approximately equal to an odd multiple of the first wavelength λ1. Abbe number of material of the optical element satisfying a condition of 15<vd<35.

With this configuration, it is possible to provide an optical information recording/reproducing device which is able to enhance the use efficiency of light for all of the three types of light beams having the different wavelengths while maintaining the compatibility with the three types of optical discs, without the need for complicated manufacturing processes, such as a process for cementing optical components made of different materials together.

In at least one aspect, the predetermined optical path length difference given to the first light beam by the at least one step may be approximately three times as large as the first wavelength λ1. In this case, the Abbe number of the material of the optical element may satisfy a condition of 15<vd<30.

In at least one aspect, when the predetermined optical path length difference given to the first light beam by the at least one step is represented by ΔOPD (nm), the optical element may satisfy a condition 2.8≦ΔOPD/λ1≦3.3.

In at least one aspect, the predetermined optical path length difference given to the first light beam by the at least one step may be approximately five times as large as the first wavelength λ1. In this case, the Abbe number of the material of the optical element may satisfy a condition of 15<vd<30.

In at least one aspect, when the predetermined optical path length difference given to the first light beam by the at least one step is represented by ΔOPD (nm), the optical element may satisfy a condition 4.8≦ΔOPD/λ1≦5.3.

In at least one aspect, the predetermined optical path length difference given to the first light beam by the at least one step may be approximately seven times as large as the first wavelength λ1.

In at least one aspect, when the predetermined optical path length difference given to the first light beam by the at least one step is represented by ΔOPD (nm), the optical element may satisfy a condition 6.8≦ΔOPD/λ1≦7.3.

In at least one aspect, the predetermined optical path length difference given to the first light beam by the at least one step may be approximately nine times as large as the first wavelength λ1.

In at least one aspect, when the predetermined optical path length difference given to the first light beam by the at least one step is represented by ΔOPD (nm), the optical element may satisfy a condition 8.8≦ΔOPD/λ1≦9.3.

In at least one aspect, the first, second and third wavelengths λ1, λ2 and λ3 may satisfy conditions: 1.6<λ2/λ1<1.8; and 1.8<λ3/λ1<2.0. In this case, the protective layer thicknesses t1, t2 and t3 may satisfy conditions: 5<t2/t1<7; and 11<t3/t1<15. Further, each and third light beams may be incident on the objective optical system as a substantially collimated beam.

In at least one aspect, the optical element may be configured such that refracting effect of the optical element with respect to the first light beam having the first wavelength λ1 and an effect given by the annular zone structure cancel with respect to each other to have power of substantially zero with respect to the first light beam having the first wavelength λ1.

In at least one aspect, the objective optical system may include an objective lens located between the optical element and an optical disc being used. The objective lens converges each of the first, second and third light beams onto a record surface of corresponding one of the first, second and third optical discs.

In at least one aspect, the optical element may be an objective lens which converges each of the first, second and third light beams onto a record surface of corresponding one of the first, second and third optical discs.

In at least one aspect, the annular zone structure may be formed in an area securing the numerical aperture NA3 required for information recording or information reproducing for the third optical disc, on the at least one surface of the optical element.

In at least one aspect, each of the first, second and third light beams may be incident on the objective optical system as a substantially collimated beam.

According to another aspect of the invention, there is provided an optical information recording/reproducing device for recording information to and/or reproducing information from at least three types of optical discs, by selectively using one of three types of light beams including a first light beam having a first wavelength λ1 (nm), a second light beam having a second wavelength λ2 (nm) and a third light beam having a third wavelength λ3 (nm). The optical information recording/reproducing includes light sources respectively emitting the first, second and third light beams, and the above described objective optical system.

In at least one aspect, the material of the above described optical element includes resin.

BRIEF DESCRIPTION OF THE
ACCOMPANYING DRAWINGS

DETAILED DESCRIPTION OF THE EMBODIMENTS

Figure 1:
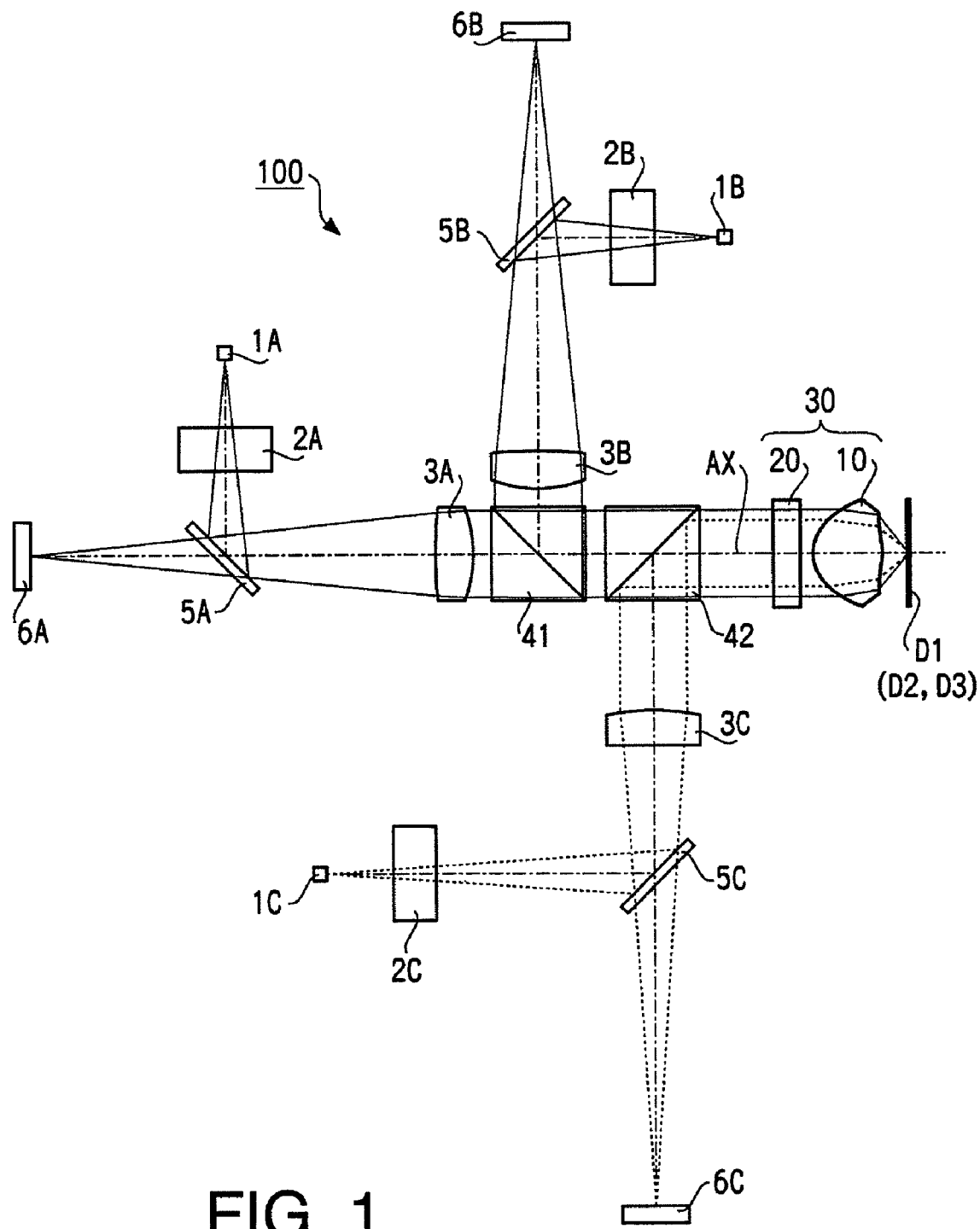
FIG. 1 is a block diagram illustrating a general configuration of an optical information recording/reproducing device according to an embodiment.

Hereinafter, an embodiment according to the invention is described with reference to the accompanying drawings.

In the following, an objective optical system 30 according to the embodiment, and an optical information recording/reproducing device 100 on which the objective optical system 30 is mounted are described (see FIG. 1).

In the following explanation, an optical disc of a type (one of the three types) having the highest recording density (e.g. a new-standard optical disc such as HD DVD or BD) will be referred to as an "optical disc D1", an optical disc of a type having a relatively low recording density compared to the optical disc D1 (DVD, DVD-R, etc.) will be referred to as an "optical disc D2", and an optical disc of a type having the lowest recording density (CD, CD-R, etc.) will be referred to as an "optical disc D3" for convenience of explanation.

If the protective layer thicknesses of the optical discs D1-D3 are defined as t1, t2, t3, respectively, the protective layer thicknesses are defined as follows.

$t1 \leq t2 < t3$

In order to carry out the information reproducing/recording on each of the optical discs D1-D3, the NA (Numerical Aperture) required for the information reproducing/recording has to be varied properly so that a beam spot suitable for the particular recording density of each optical disc can be formed. When the optimum design numerical apertures required for the information reproducing/recording on the three types of optical discs D1, D2 and D3 are defined as NA1, NA2 and NA3, respectively, the numerical apertures (NA1, NA2, NA3) satisfy the following relationships:

(NA1>NA3) and (NA2>NA3)

Specifically, for the information recording/reproducing on the optical discs D1 and D2 having high recording densities, a relatively large NA is required since a relatively small spot has to be formed. On the other hand, for the information recording/reproducing on the optical disc D3 having the lowest recording density, the required NA is relatively small. Incidentally, each optical disc is set on a turntable (not shown) and rotated at high speed when the information recording/reproducing is carried out.

In cases where three types of optical discs D1-D3 (having different recording densities) are used as above, multiple laser beams having different wavelengths are selectively used by the optical information recording/reproducing device so that a beam spot suitable for each recording density can be formed on the record surface of the optical disc being used.

Specifically, for the information recording/reproducing on the optical disc D1, a "first laser beam" having the shortest wavelength is emitted from a light source so as to form the smallest beam spot on the record surface of the optical disc D1. On the other hand, for the information recording/reproducing on the optical disc D3, a "third laser beam" having the longest wavelength is emitted from a light source so as to form the largest beam spot on the record surface of the optical disc D3. For the information recording/reproducing on the optical disc D2, a "second laser beam" having a wavelength longer than that of the first laser beam and shorter than that of the third laser beam is emitted from a light source so as to form a relatively small beam spot on the record surface of the optical disc D2.

If the wavelengths of the first, second and third laser beams are defined as $\lambda 1$, $\lambda 2$ and $\lambda 3$, respectively, the wavelengths satisfy the following relationship.

$\lambda 1 < \lambda 2 < \lambda 3$

Furthermore, the wavelengths $\lambda 1$ and $\lambda 3$ satisfy the following relationship.

$1.8 < \lambda 3/\lambda 1 < 2.0$

FIG. 1 illustrates a general configuration of the optical information recording/reproducing device 100 on which the objective optical system 30 is mounted. As shown in FIG. 1, the optical information recording/reproducing device 100 includes a light source 1A which emits the first laser beam, a light source 1B which emits the second laser beam, a light source 1C which emits the third laser beam, diffraction gratings 2A, 2B and 2C, coupling lenses 3A, 3B and 3C, beam splitters 41 and 42, half mirrors 5A, 5B and 5C, photoreceptors 6A, 6B and 6 the objective optical system 30.

In FIG. 1, a reference axis AX of the optical information recording/reproducing device 100 is indicated by a chain line. In a normal state, an optical axis of the objective optical system 30 coincides with the reference axis AX of the optical information recording/reproducing device 100. However, the optical axis of the objective optical system 30 or an optical axis of an objective lens 10 may be shifted from the reference axis AX for a tracking operation.

As described above, the required NA varies depending on the type of the optical disc being used. Therefore, the optical information recording/reproducing device 100 may be provided with one or more aperture stops for adjusting beam diameters of the first to third laser beams.

Each optical disc has the protective layer and the record surface (not shown). Practically, the record surface is sandwiched between the protective layer and a substrate layer or a label layer.

As shown in FIG. 1, the first, second and third laser beams emitted by the light sources 1A, 1B and 1C are directed to a common optical path after passing through the diffraction gratings 2A, 2B, and 2C, the coupling lenses 3A, 3B and 3C, and the beam splitters 41 and 42. Then, each first, second and third laser beams enters the objective optical system 30. The first, second and third laser beams emitted by the light sources 1A, 1B and 1C are converted into collimated beams by the coupling lenses 3A, 3B and 3C, respectively. That is, in this embodiment, each of the coupling lenses 3A, 3B and 3C functions as a collimator lens. Therefore, each of the first, second and third laser beams enters the objective optical system 30 as a collimated beam.

By thus configuring the optical information recording/reproducing device 100, it is possible to suitably suppress off-axis aberrations, such as a coma, even if the objective optical system 30 (i.e., the objective lens 10) shifts by a minute distance in a direction perpendicular to the optical axis of the objective optical system 30 for the tracking operation.

Each of the first, second and third laser beams passed through the objective optical system 30 converges onto the record surface 52 (see FIG. 2A) of the corresponding optical disc. The laser beam reflected from the record surface 52 of each of the optical discs D1, D2 and D3 returns toward the objective optical system 30 along the same optical path, and thereafter passes through the corresponding one of the half mirror 5A, 5B and 5C before finally detected by the corresponding one of the photoreceptors 6A, 6B and 6C.

Since the first to third laser beams having different wavelengths are used for the optical discs D1-D3 in the optical information recording/reproducing device 100, the spherical aberration varies depending on change of the refractive index of the objective lens 10 and the difference in protective layer thicknesses between the optical discs D1-D3. In order to provide the compatibility with the three types of optical discs D1-D3 for the optical information recording/reproducing device 100, it is necessary to suitably correct the spherical aberration for each of the optical discs D1-D3. In order to perform the information recording/reproducing, for each of the optical discs D1-D3, in a high degree of accuracy while keeping a high S/N level, it is necessary to increase the use efficiency of light so that a beam spot having a predetermined diameter is formed on the record surface of the optical disc being used. For this reason, the objective optical system 30 according to the embodiment is configured as follows.

Figure 2A:
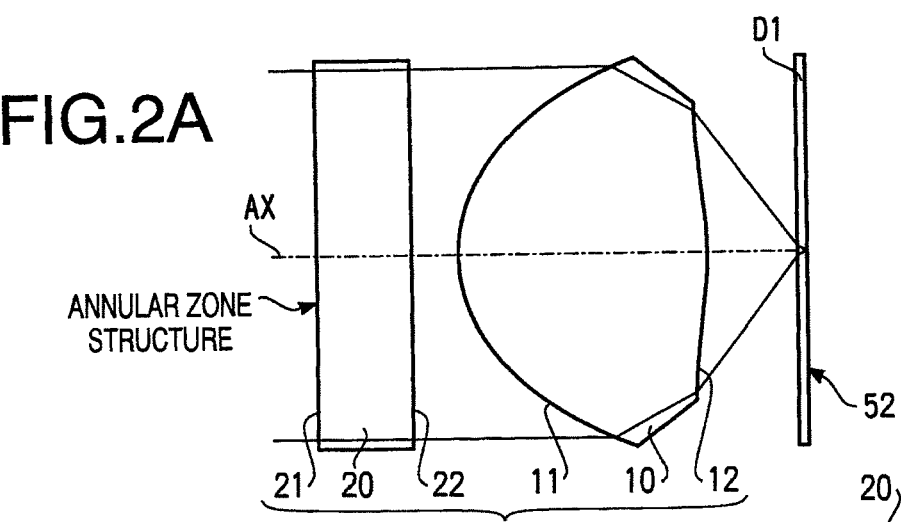
FIG. 2A is an enlarged view of an objective optical system provided in the optical information recording/reproducing device.

As shown in FIG. 1, the objective optical system 30 includes an optical element 20 and the objective lens 10 arranged, along the optical path, in this order from the light source side. FIG. 2A is an enlarged view of the objective optical system 30.

As shown in FIG. 2A, the objective lens 10 has a first surface 11 and a second surface 12 arranged in this order from the light source side. The objective lens 10 is a biconvex single-element lens of which first and second surfaces 11 and 12 are aspherical surfaces.

A shape of an aspherical surface is expressed by a following equation:

$$X(h) = \frac{ch^2}{1+\sqrt{1-(1+K)c^2h^2}} + \sum_{i=2} A_{2i}h^{2i}$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_{2i}$ represents an aspherical coefficient of an even order larger than or equal to the fourth order.

By forming each of the first and second surface 11 and 12 of the objective lens 10 to be an aspherical surface, it becomes possible to suitably correct the spherical aberration.

The optical element 20 is made of a single material. In order to secure easiness and effectiveness in manufacturing, the optical element 20 is made of resin. The material of the optical element 20 is chosen such that the Abbe number vd satisfies a following condition (1).

$$15 < vd < 35 \tag{1}$$

By thus selecting the material having a high degree of dispersion, it becomes possible to increase the use efficiency of the third laser beam while keeping the use efficiency of the first laser beam at a high level.

Figure 2B:
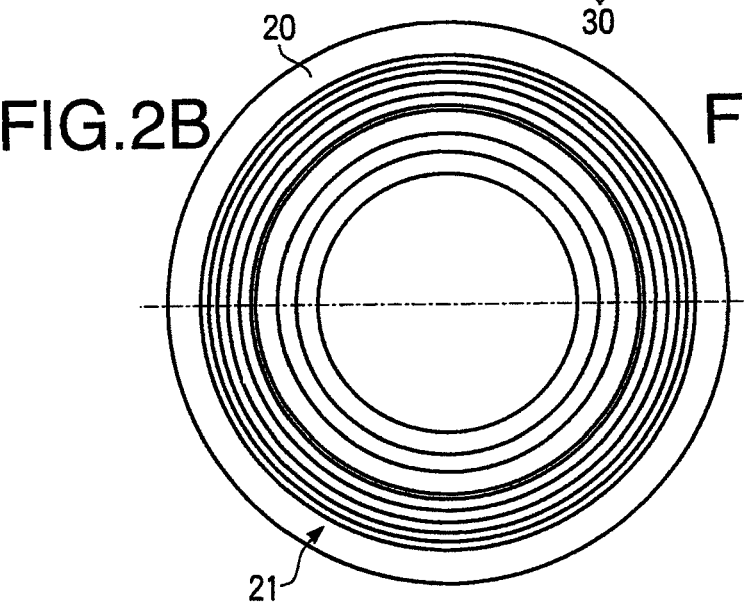
FIGS. 2B and 2C are conceptual illustrations of an annular zone structure formed on a first surface of an optical element.
Figure 2C:
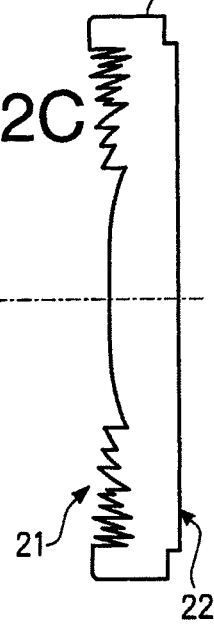

At least one of first and second surfaces 21 and 22 of the optical element 20 is provided with an annular zone structure having a plurality of refractive surface zones (annular zones) concentrically formed about the reference axis AX. The plurality of annular zones are divided by minute steps formed between adjacent ones of the plurality of annular zones. In this embodiment, the annular zone structure is formed on the first surface 21 of the optical element 20. FIGS. 2B and 2C are conceptual illustrations of the annular zone structure formed on the first surface 21 of the optical element. FIG. 2B is a front view illustrating the annular zone structure formed on the first surface 21 of the optical element 20, and FIG. 2C is a cross sectional view of the optical element 20 illustrating the annular zone structure formed on the first surface 21 of the optical element 20.

As described above, the annular zone structure is provided with steps, each of which extends in a direction of the optical axis at a boundary between the adjacent ones of the annular zones. Each step is designed such that a predetermined optical path length difference is given between a laser beam passing through the inside of the boundary and a laser beam passing through the outside of the boundary. It is noted that such an annular zone structure may be called a diffraction structure.

If the annular zone structure is designed such that the predetermined optical path length difference is a n-fold value (n: integer) of a particular wavelength α, the annular zone structure may be expressed as an n-th order diffraction structure having the blazed wavelength α. If a laser beam having a particular wavelength β passes through the diffraction structure, the diffraction order having the highest diffraction efficiency is equal to an integer "m" closest to a value obtained by dividing the optical path length difference with the wavelength β.

If the annular zone structure is considered as the diffraction structure, the annular zone structure can be expressed by a following optical path difference function φ(h). The optical path difference function φ(h) represents the function as a diffraction lens in a form of an additional optical path length at a height h from the optical axis. That is, the optical path difference function φ(h) is a function which defines the position and height of each step in the annular zone structure.

More specifically, the optical path difference function φ(h) can be expressed by an equation:

$$\phi(h) = m\lambda \sum_{i=1} P_{2i}h^{2i}$$

where $P_{2i}$ represents the 2i-th order coefficient (i: integer), h represents a height from the optical axis, m represents a diffraction order at which the diffraction efficiency is maximized, and λ represents a design wavelength of a laser beam being used.

The annular zone structure of the optical element 20 is configured such that at least one step gives, to the first laser beam, an optical path length difference approximately equal to an odd multiple of the wavelength of the first laser beam. When the annular zone structure is expressed by the above described equation, the wavelength $\lambda 1$ is assigned to the variable λ, and an odd number larger than or equal to 3 is assigned to the variable m. By thus defining the annular zone structure with respect to the wavelength $\lambda 1$ of the first laser beam, the information recording/reproducing for the optical disc D1 which requires a higher degree of use efficiency of light and has low tolerance to aberrations can be performed with a high degree of accuracy.

By assigning an odd number to the diffraction order m at which the use efficiency of light (diffraction efficiency) is maximized, the annular zone structure is able to provide different diffraction functions for the first laser beam and the third laser beam, respectively. Therefore, it is possible to achieve a suitable correcting function of correcting aberrations for each of the optical discs D1 and D3 of different standards.

The Abbe number of the material of the optical element 20 is selected depending on the configuration of the annular zone structure designed in relation to the optical path length difference given by the at least one step in the annular zone structure.

More specifically, when the annular zone structure is configured such that an optical path length difference ΔOPD given to the first laser beam by the at least one step is approximately three times as large as the wavelength $\lambda 1$ (i.e., if the annular zone structure is configured to satisfy the following condition (2)), the optical element 20 is configured such that the Abbe number νd of the material of the optical element 20 satisfies the above described condition (1). In this case, the optical element 20 may be configured such that the Abbe number νd of the material of the optical element 20 satisfies the following condition (3).

$$2.8 \leq \Delta OPD/\lambda 1 \leq 3 \quad (2)$$

$$15 \leq \nu d \leq 30 \quad (3)$$

When the annular zone structure is configured such that an optical path length difference ΔOPD given to the first laser beam by the at least one step is approximately five times as large as the wavelength $\lambda 1$ (i.e., if the annular zone structure is configured to satisfy the following condition (4)), the optical element 20 is configured such that the Abbe number νd of the material of the optical element 20 satisfies the above described condition (1). In this case, the optical element 20 may be configured such that the Abbe number νd of the material of the optical element 20 satisfies the condition (3).

$$4.8 \leq \Delta OPD/\lambda 1 \leq 5.3 \quad (4)$$

$$15 \leq \nu d \leq 30 \quad (3)$$

It is possible to configure the annular zone structure such that an optical path length difference ΔOPD given to the first laser beam by the at least one step is approximately seven times as large as the wavelength $\lambda 1$. That is, the annular zone structure may be configured to satisfy the following condition (5). It is also possible to configure the annular zone structure such that an optical path length difference ΔOPD given to the first laser beam by the at least one step is approximately nine times as large as the wavelength $\lambda 1$. That is, the annular zone structure may be configured to satisfy the following condition (6).

$$6.8 \leq \Delta OPD/\lambda 1 \leq 7.3 \quad (5)$$

$$8.8 \leq \Delta OPD/\lambda 1 \leq 9.3 \quad (6)$$

By thus defining the optical path length difference given to the first laser beam by the annular zone structure and by suitably selecting the Abbe number of the optical element 20 (i.e., by designing the annular zone structure and the optical element 20 to satisfy the above described conditions), it is possible to maintain the use efficiency of the first laser beam at a high level. In this embodiment, the use efficiency of 70% or more can be achieved for the first laser beam. Furthermore, by employing the optical element 20 having a high degree of dispersion, it is also possible to enhance the use efficiency of the third laser beam.

As described above, the optical element 20 is made of material having a relatively low Abbe number (i.e., material having a high degree of dispersion). In general, a designer of an objective optical system for an optical information recording/reproducing device tends to avoid use of material having a high degree of dispersion because material having a high degree of dispersion produces a relatively large amount of aberration. By contrast, according to the embodiment, the optical element 20 is configured such that, with regard to the first laser beam, the refracting effect is cancelled by the effect provided by the annular zone structure. In other words, the optical element 20 has almost no power with respect to the first laser beam. Consequently, the amount of chromatic aberration can be suppressed.

Figure 3A:
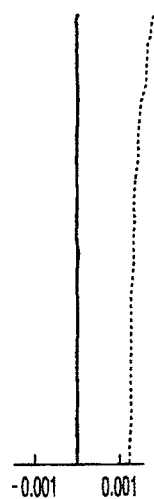
FIG. 3A is a graph illustrating the spherical aberration related to a first laser beam ($\lambda 1$=408 nm) passed through an objective optical system having an optical element made of material having a low degree of dispersion.

For comparison, FIG. 3A provides a graph illustrating the spherical aberration related to the first laser beam ($\lambda 1$=408 nm) passed through an objective optical system having an optical element (corresponding to the optical element 20) made of material having a low degree of dispersion. In FIG. 3A, the low degree of dispersion is defined as nd=1.509 and νd=56.4. In this case, nd represents a refractive index at a d-ray (588 nm), and νd represents the Abbe number at a d-ray.

Figure 3B:
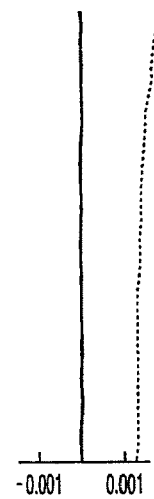
FIG. 3B is a graph illustrating the spherical aberration related to the first laser beam ($\lambda 1$=408 nm) passed through the objective optical system having an optical element made of material having a high degree of dispersion.

FIG. 3B is a graph illustrating the spherical aberration related to the first laser beam ($\lambda 1$=408 nm) passed through the objective optical system 30 having the optical element 20 made of material having a high degree of dispersion. In FIG. 3B, the high degree of dispersion is defined as nd=1.585 and νd=29.9.

In each of FIGS. 3A and 3B, a curve indicated by a solid line corresponds to the spherical aberration when the wavelength of the first laser beam is 408 nm, and a curve indicated by a dashed line corresponds to the spherical aberration when the wavelength of the first laser beam shifts, by a minute amount, from 408 nm to 410 nm. It is understood from FIGS. 3A and 3B that the chromatic aberration caused in the objective optical system 30 including the optical element 20 according to the embodiment is at substantially the same level as the chromatic aberration caused in an objective optical system including an optical element (corresponding to the optical element 20) made of material having a low degree of dispersion.

As described above, the objective optical system 30 according to the embodiment has advantages in that it enhances the use efficiency of light for the optical disc D3 while maintaining the use efficiency of light for the optical disc D1 at a high level. In this regard, in the following, the configuration of the optical information recording/reproducing device 100 according to the embodiment is explained specifically for the relationship between the optical disc D1 and the optical disc D3. That is, in the following, explanation focuses on an optical information recording/reproducing device (hereafter, referred to as a special-purpose optical information recording/reproducing device) having the compatibility with an optical disc Da having a very high recording density and an optical disc Db having a low recording density. Such an optical information recording/reproducing device can be achieved, for example, by omitting the optical components provided for the information recording/reproducing for the optical disc D2 from the optical information recording/reproducing device 100.

In this case, the optical disc Da corresponds to the optical disc D1, and the optical disc Db corresponds to the optical disc D3. As in the case of the optical information recording/reproducing device 100 according to the embodiment, the following conditions are satisfied for the special-purpose optical information recording/reproducing device.

$$ta < tb$$

$$NAa > Nab$$

$$\lambda a < \lambda b$$

$$1.8 < \lambda b / \lambda a < 2.0$$

In the above described conditions, ta represents the protective layer thickness (corresponding to the protective layer thickness t1) of the optical disc Da, NAa represents an optimum design numerical aperture (corresponding to the numerical aperture NA1) required for information recording/reproducing for the optical disc Da, NAb represents an optimum design numerical aperture (corresponding to the numerical aperture NA3) required for information recording/reproducing for the optical disc Db, $\lambda a$ represents a wavelength of a laser beam (corresponding to the wavelength $\lambda 1$ of the first laser beam) used for information recording/reproducing for the optical disc Da, and $\lambda b$ represents a wavelength of a laser beam (corresponding to the wavelength $\lambda 3$ of the second laser beam) used for information recording/reproducing for the optical disc Db.

The optical element 20 employed in the special-purpose optical information recording/reproducing device is configured to satisfy the conditions (1) to (6). With this configuration, it becomes possible to enhance the use efficiency of light for the optical disc Db having the low recording density while maintaining the use efficiency of light for the optical disc Da having the high recording density at a high level, without employing expensive and high precision optical components.

Regarding the special-purpose optical information recording/reproducing device, the conditions (2), (4), (5) and (6) are rewritten to the following conditions (2'), (3'), (4) and (6'), respectively.

$$2.8 \leq \Delta OPD/\lambda a \leq 3.3 \quad (2')$$

$$4.8 \leq \Delta OPD/\lambda a \leq 5.3 \quad (4')$$

$$6.8 \leq \Delta OPD/\lambda a \leq 7.3 \quad (5')$$

$$8.8 \leq \Delta OPD/\lambda a \leq 9.3 \quad (6')$$

Hereafter, three production examples (first to third production examples) of the optical element 20 are described. More specifically, the relationship between the use efficiency of light and the wavelength is explained for each of the first to third production examples. In the following production examples, the wavelengths are $\lambda 1$=408 nm, $\lambda 2$=660 nm, and $\lambda 3$=790 nm.

Figure 4:
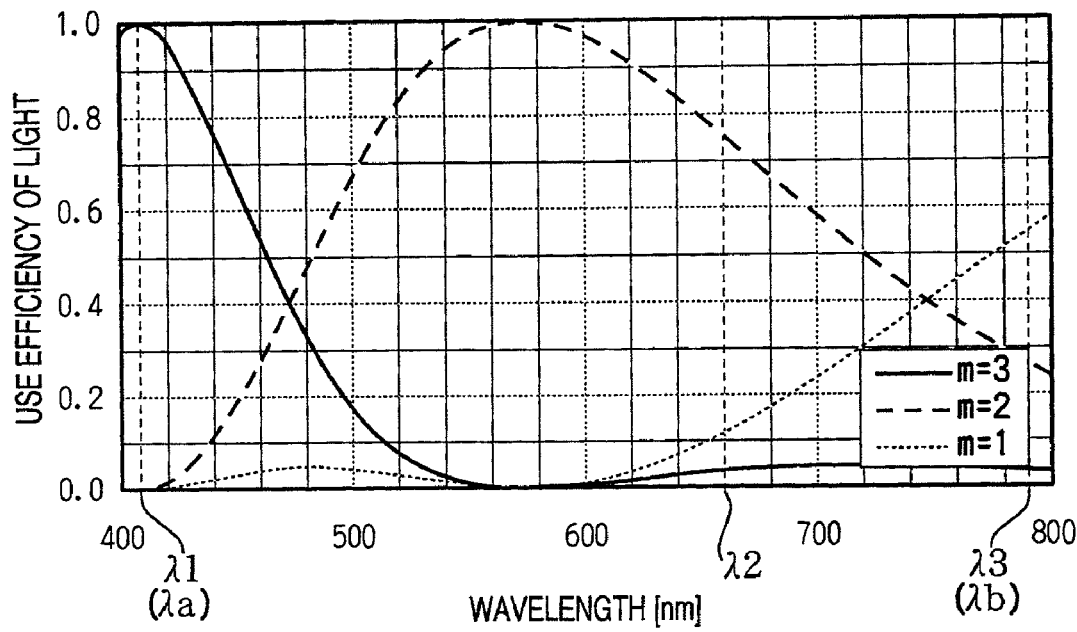
FIGS. 4-7 are graphs illustrating the relationship between the wavelength and the use efficiency of light achieved by a first production example of an optical element provided in the objective optical system.
Figure 5:
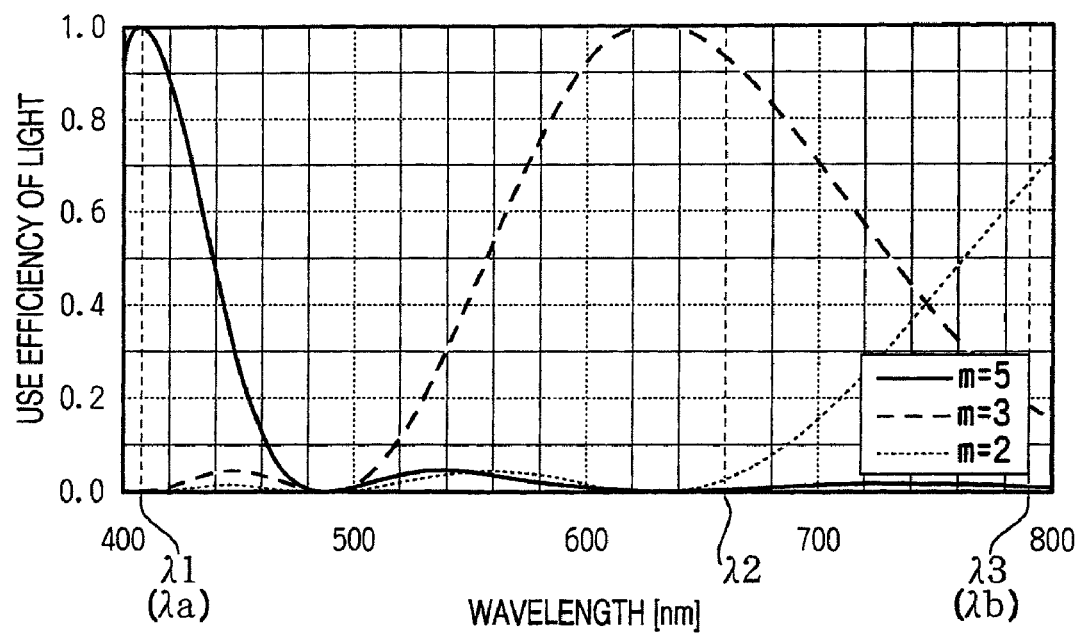
Figure 6:
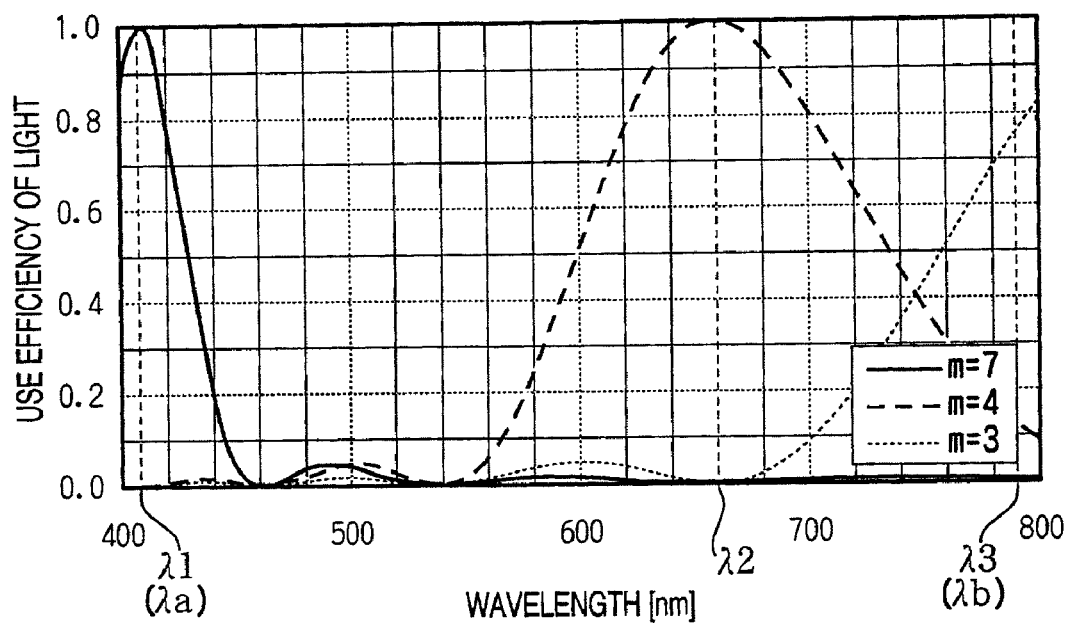
Figure 7:
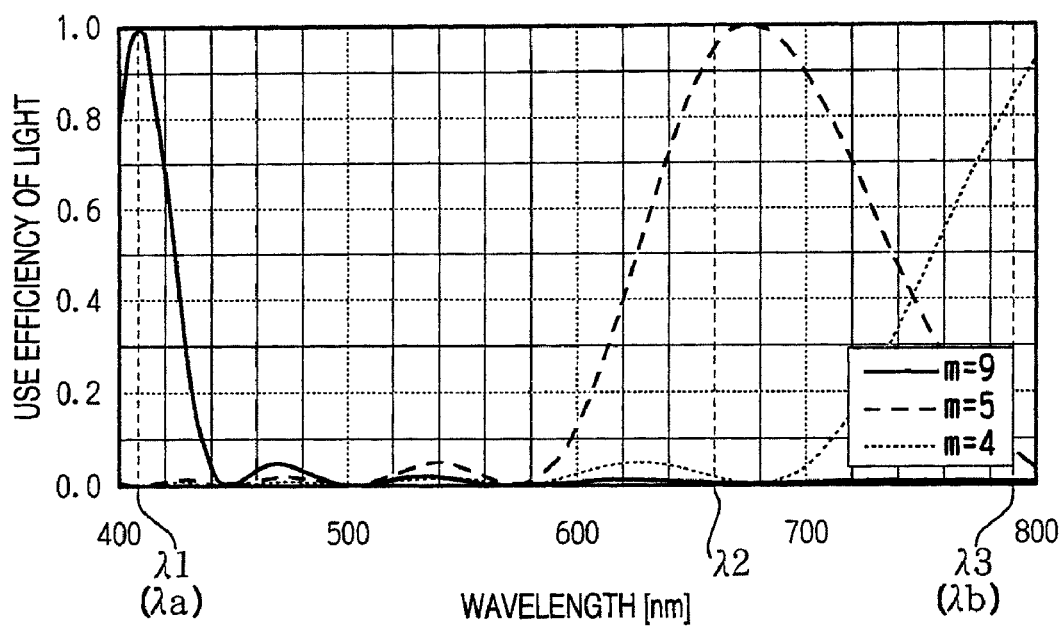

FIGS. 4 to 7 are graphs illustrating the relationship between the wavelength and the use efficiency of light achieved by a first production example of the optical element 20. More specifically, FIG. 4 is a graph illustrating the relationship between the wavelength and the use efficiency of light achieved by the optical element 20 satisfying the condition (2) or (2'), FIG. 5 is a graph illustrating the relationship between the wavelength and the use efficiency of light achieved by the optical element 20 satisfying the condition (4) or (4'), FIG. 6 is a graph illustrating the relationship between the wavelength and the use efficiency of light achieved by the optical element 20 satisfying the condition (5) or (5'), and FIG. 7 is a graph illustrating the relationship between the wavelength and the use efficiency of light achieved by the optical element 20 satisfying the condition (6) or (6').

The first production example of the optical element 20 is made of material of nd=1.585 and vd=29.9. On one of surfaces of the optical element 20, the annular zone structure is formed. Regarding the first production example, the annular zone structure which is blazed at the wavelength of 408 nm (i.e., $\lambda 1$) is formed on the first surface 21 of the optical element 20.

Figure 8:
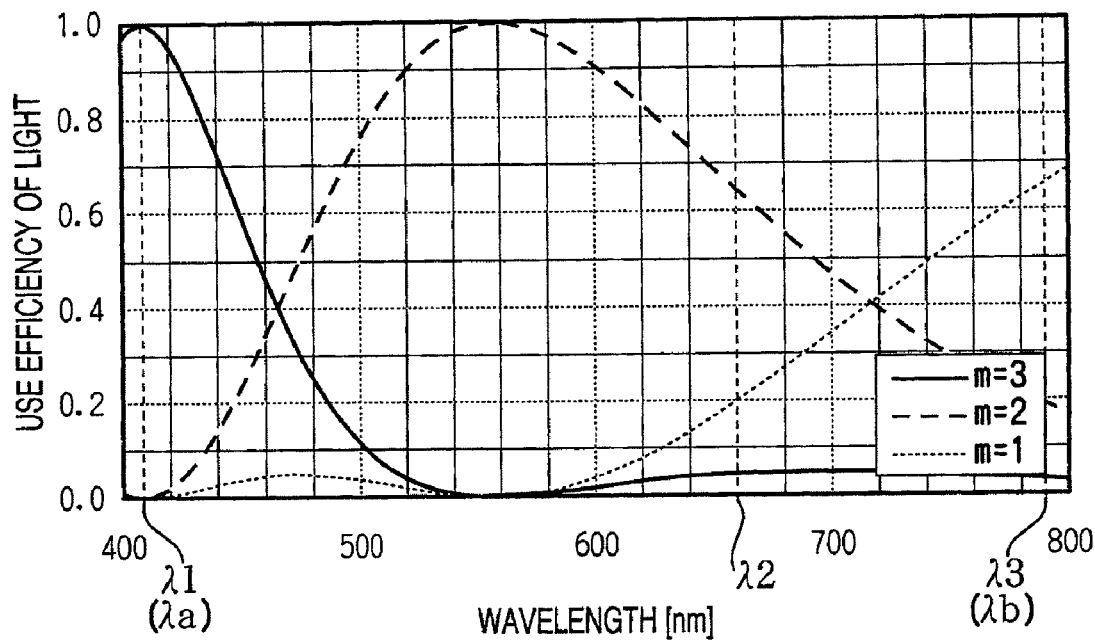
FIGS. 8-11 are graphs illustrating the relationship between the wavelength and the use efficiency of light achieved by a second production example of an optical element provided in the objective optical system.
Figure 9:
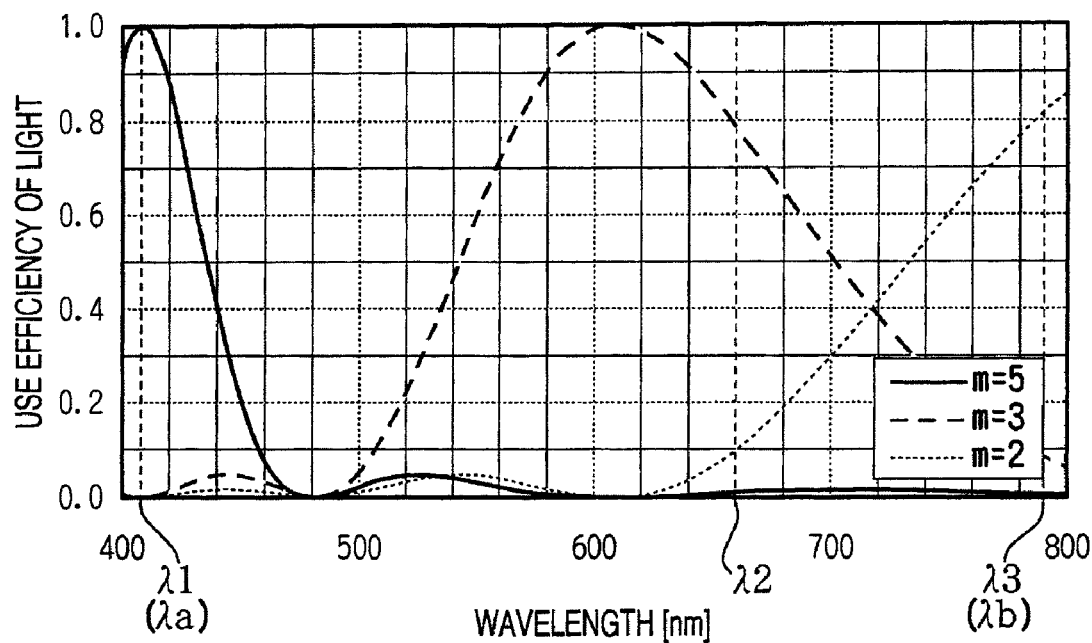
Figure 10:
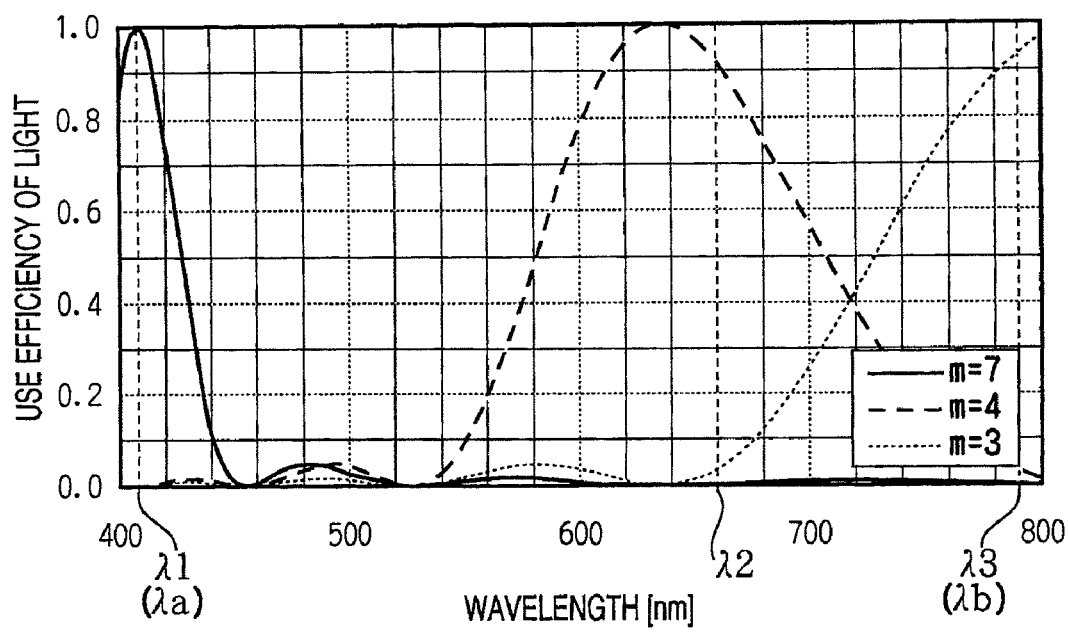
Figure 11:
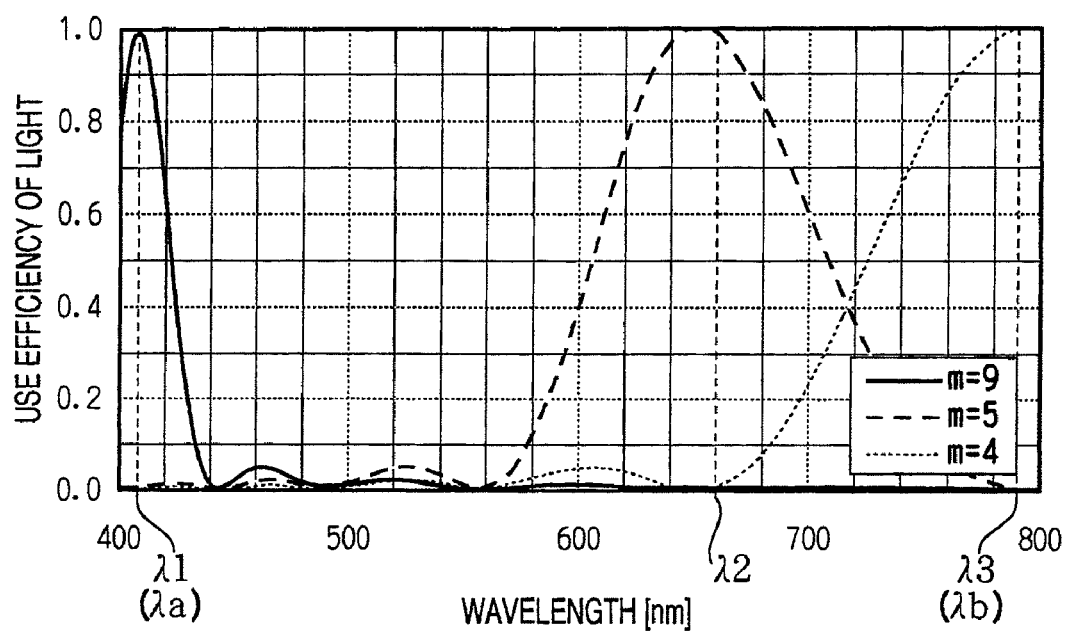

FIGS. 8 to 11 are graphs illustrating the relationship between the wavelength and the use efficiency of light achieved by a second production example of the optical element. More specifically, FIG. 8 is a graph illustrating the relationship between the wavelength and the use efficiency of light achieved by the optical element 20 satisfying the condition (2) or (2'), FIG. 9 is a graph illustrating the relationship between the wavelength and the use efficiency of light achieved by the optical element 20 satisfying the condition (4) or (4'), FIG. 10 is a graph illustrating the relationship between the wavelength and the use efficiency of light achieved by the optical element 20 satisfying the condition (5) or (5'), and FIG. 11 is a graph illustrating the relationship between the wavelength and the use efficiency of light achieved by the optical element 20 satisfying the condition (6) or (6').

The second production example of the optical element 20 is made of material of nd=2.144 and vd=17.8. On one of surfaces of the optical element 20, the annular zone structure is formed. Regarding the second production example, the annular zone structure which is blazed at the wavelength of 408 nm (i.e., $\lambda 1$) is formed on the first surface 21 of the optical element 20.

Figure 12:
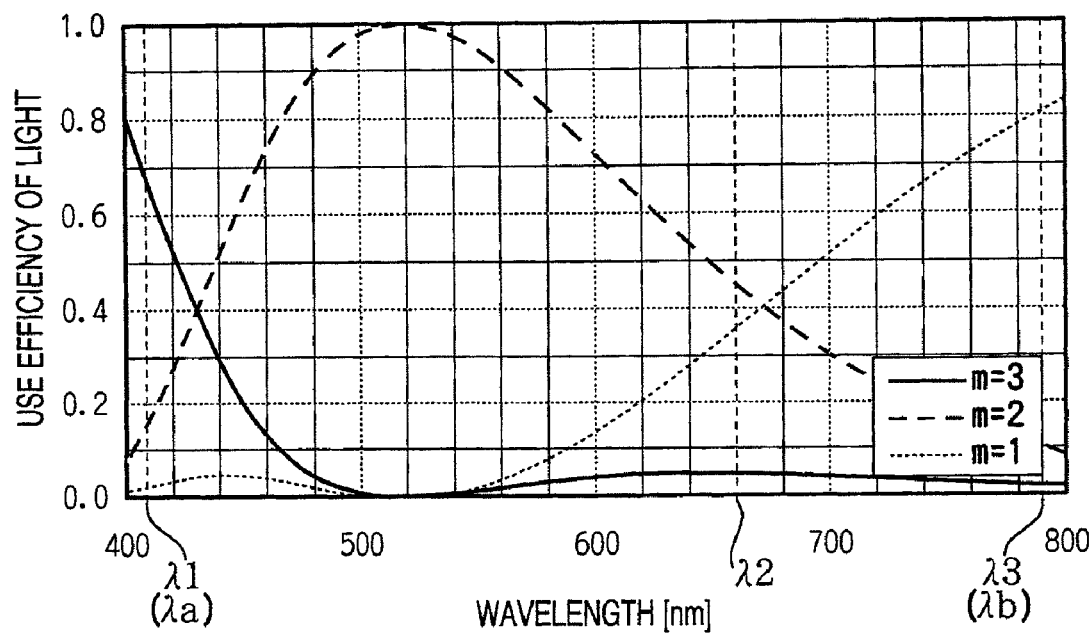
FIGS. 12-15 are graphs illustrating the relationship between the wavelength and the use efficiency of light achieved by a third production example of an optical element provided in the objective optical system.
Figure 13:
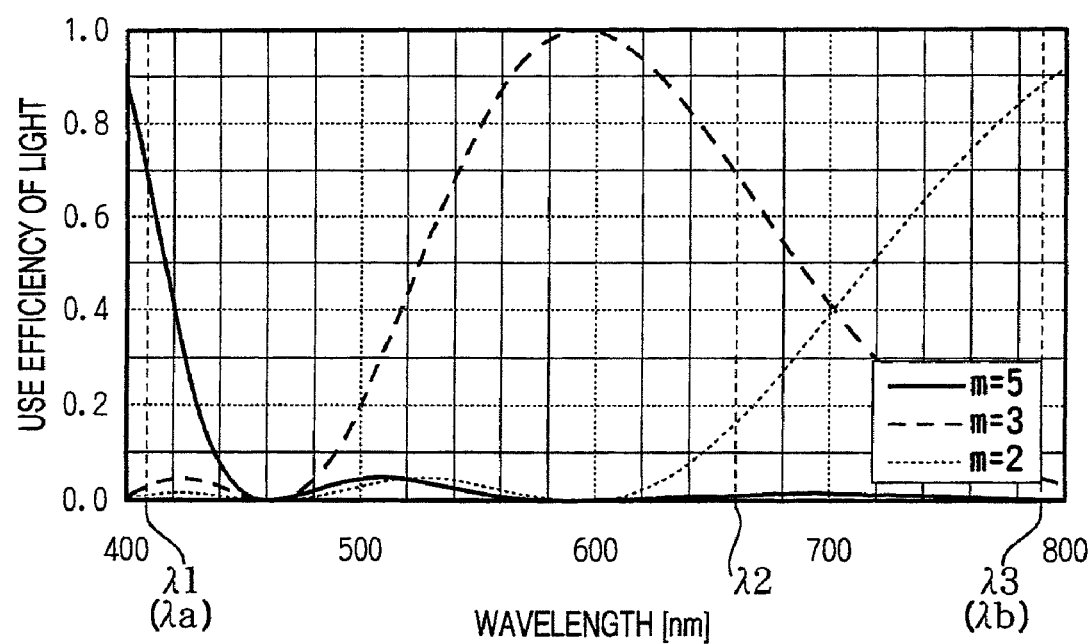
Figure 14:
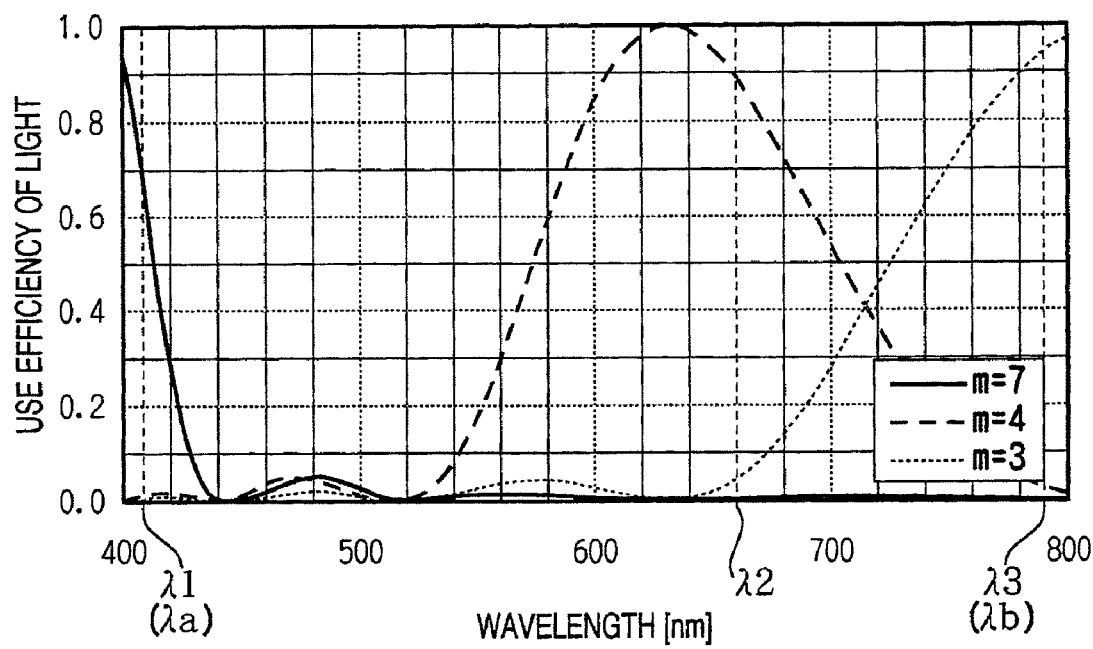
Figure 15:
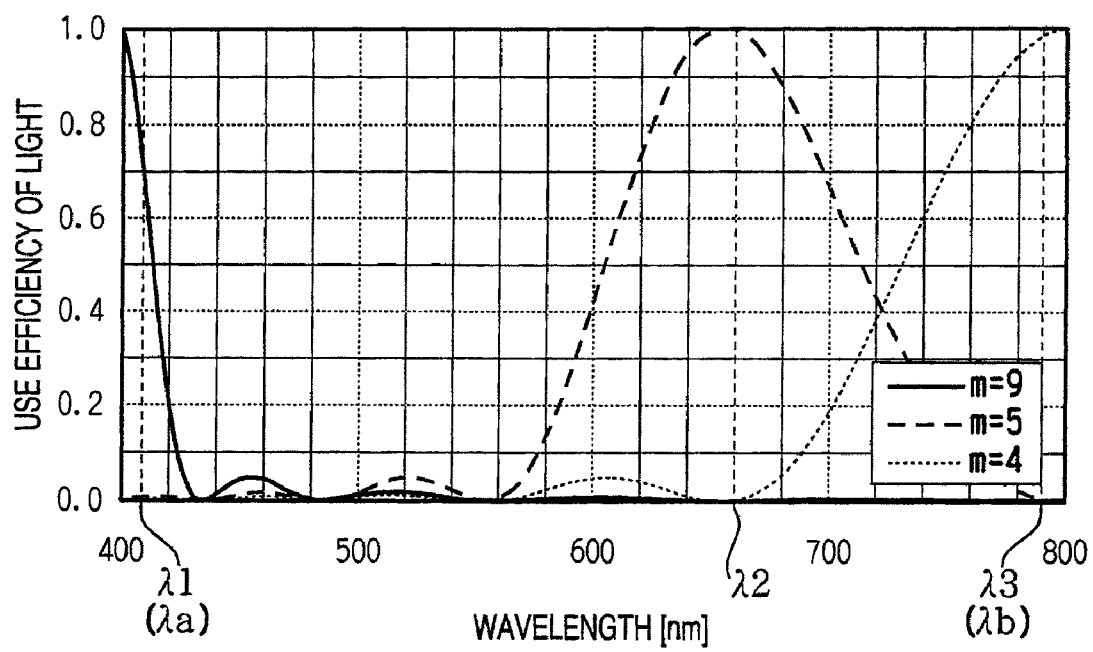

FIGS. 12 to 15 are graphs illustrating the relationship between the wavelength and the use efficiency of light achieved by a third production example of the optical element 20. More specifically, FIG. 12 is a graph illustrating the relationship between the wavelength and the use efficiency of light achieved by the optical element 20 satisfying the condition (2) or (2'), FIG. 13 is a graph illustrating the relationship between the wavelength and the use efficiency of light achieved by the optical element 20 satisfying the condition (4) or (4'), FIG. 14 is a graph illustrating the relationship between the wavelength and the use efficiency of light achieved by the optical element 20 satisfying the condition (5) or (5'), and FIG. 15 is a graph illustrating the relationship between the wavelength and the use efficiency of light achieved by the optical element 20 satisfying the condition (6) or (6').

As in the case of the first production example, the third production example of the optical element 20 is made of material of nd=1.585 and vd=29.9. On one of surfaces of the optical element 20, the annular zone structure is formed. Regarding the third production example, the annular zone structure blazed differently depending on which of the condition (2) (or (2')), (4) (or (4')), (5) (or (5')) and (6) (or (6')) the optical element 20 satisfies is formed on the first surface 21 of the optical element 20. More specifically, when the condition (2) or (2') is satisfied, the annular zone structure blazed at the wavelength of 379 nm is formed on the optical element 20. When the condition (4) or (4') is satisfied, the annular zone structure blazed at the wavelength of 390 nm is formed on the optical element 20. When the condition (5) or (5') is satisfied, the annular zone structure blazed at the wavelength of 395 nm is formed on the optical element 20. When the condition (6) or (6') is satisfied, the annular zone structure blazed at the wavelength of 398 nm is formed on the optical element 20.

As can be seen from FIGS. 4, 8 and 12, by employing the optical element 20 satisfying the condition (2) or (2'), high use efficiency of light larger than or equal to 50% can be achieved for the first order diffraction light of the third laser beam (or the laser beam of the wavelength of $\lambda b$), and high use efficiency of light larger than or equal to approximately 70% can be achieved around the wavelength of $\lambda 1$ (or $\lambda a$). That is, by employing the optical element 20 according to each of the first to third production examples, it is possible to maintain the use efficiency of light of the first laser beam at a high level even if the wavelength fluctuates by a minute amount.

As can be seen from FIGS. 5-7, FIGS. 9-11, and FIGS. 13-15, the higher the diffraction order at which the use efficiency of light of the first laser beam is maximized becomes, the higher the use efficiency of light of a particular diffraction order of the third laser bear becomes. Further, the higher the diffraction order at which the use efficiency of light of the first laser beam is maximized becomes, the higher the use efficiency of light of the second laser beam becomes. Therefore, all of the first to third production examples of the optical element 20 are able to perform the information recording and information reproducing with a high degree of accuracy for each of the optical discs D1-D3.

Hereafter, two comparative examples (first and second comparative examples) of an optical element are explained for verifying the usefulness of the first to third production examples of the optical element 20.

An optical element according to a first comparative example is made of material having a low degree of dispersion (nd=1.509 and vd=56.4), and is provided with the annular zone structure blazed at the wavelength of 408 nm. That is, the optical element according to the first comparative example does not satisfy the condition (1). FIGS. 16-19 are graphs illustrating the relationships between the wavelength and the use efficiency of light achieved by the optical element according to the first comparative example.

Figure 16:
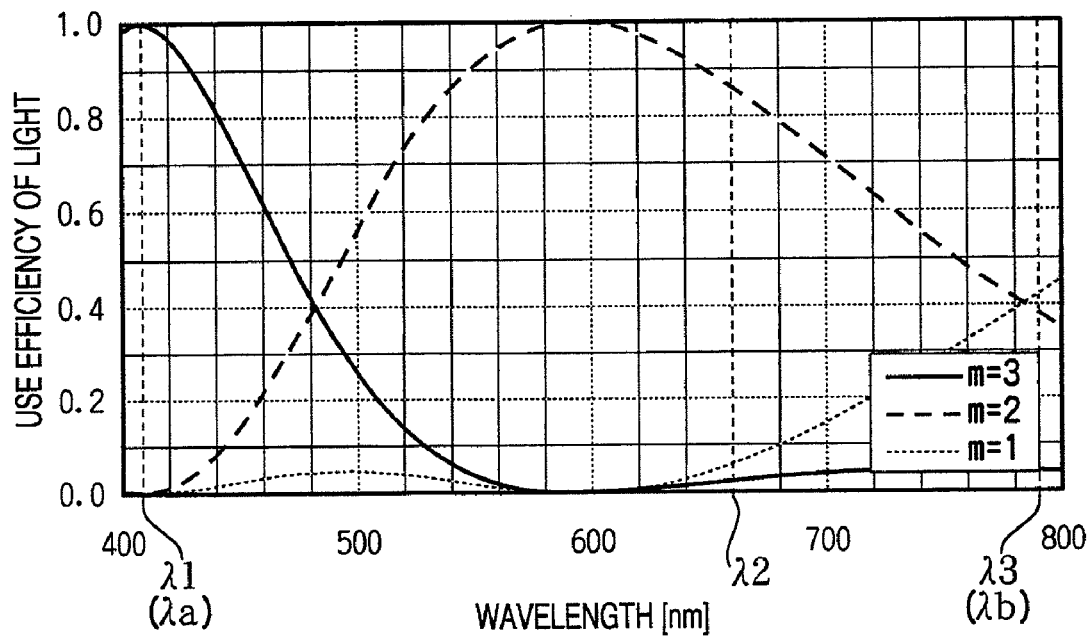
FIGS. 16-19 are graphs illustrating the relationship between the wavelength and the use efficiency of light achieved by an optical element according to a first comparative example.
Figure 17:
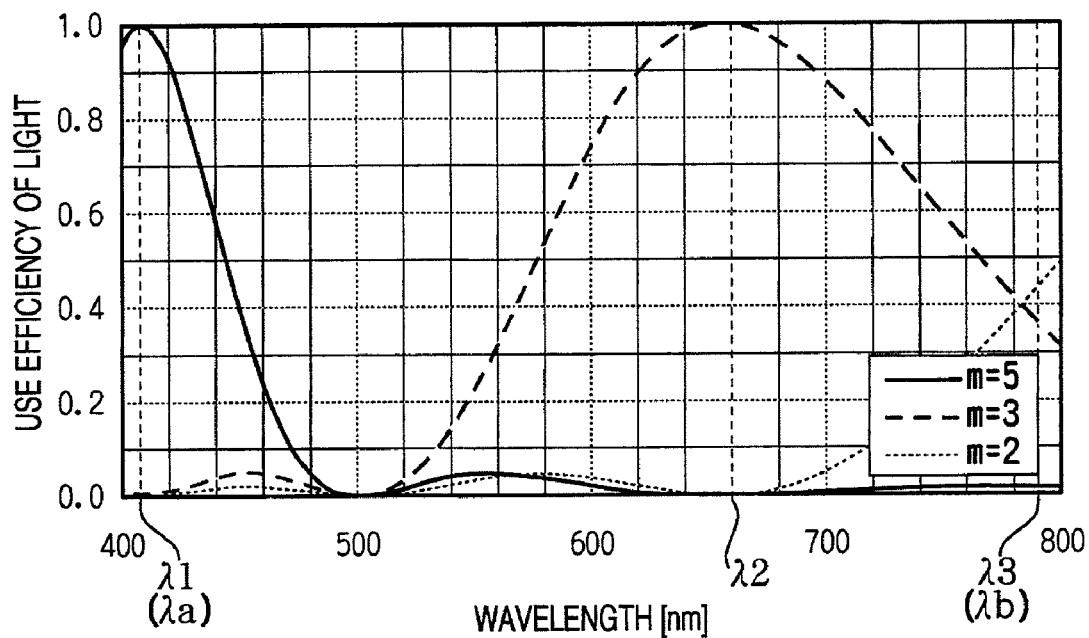
Figure 18:
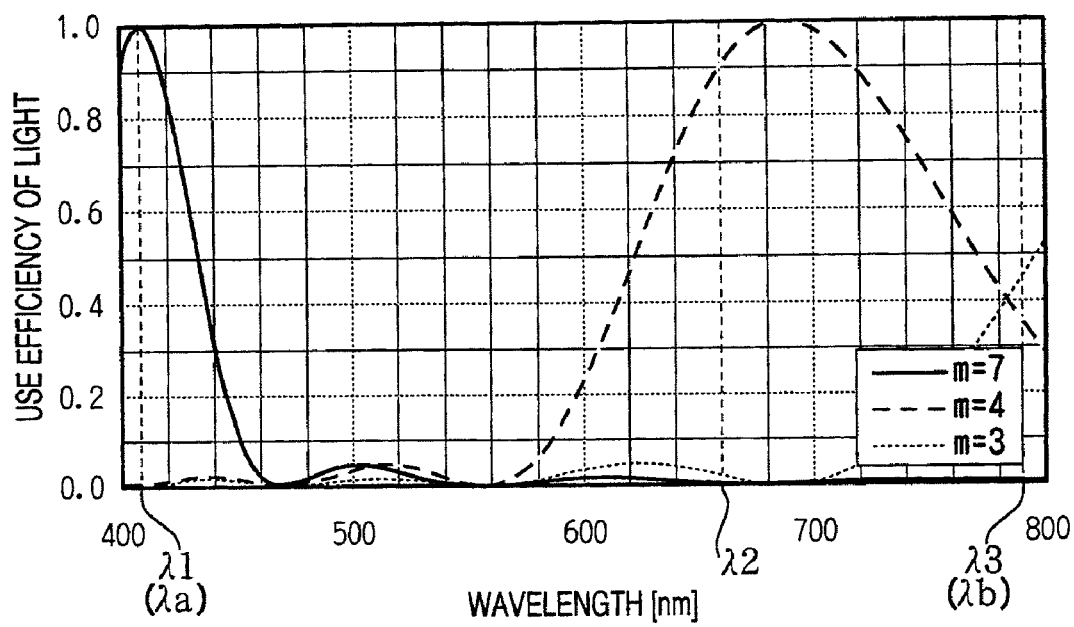
Figure 19:
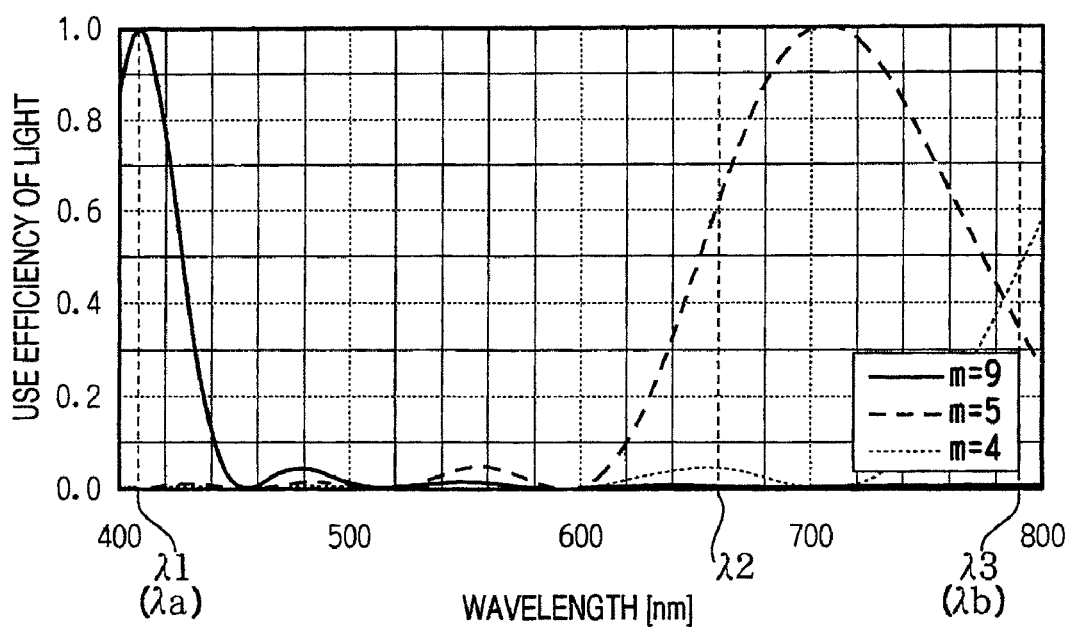

More specifically, FIG. 16 shows the case where the annular zone structure is designed such that the diffraction order at which the use efficiency of light of the firs laser beam is maximized is the third order. FIG. 17 shows the case where the annular zone structure is designed such that the diffraction order at which the use efficiency of light of the firs laser beam is maximized is the fifth order. FIG. 18 shows the case where the annular zone structure is designed such that the diffraction order at which the use efficiency of light of the firs laser beam is maximized is the seventh order. FIG. 19 shows the case where the annular zone structure is designed such that the diffraction order at which the use efficiency of light of the firs laser beam is maximized is the ninth order.

An optical element according to a second comparative example is made of material having a low degree of dispersion (nd=1.509 and vd=56.4). That is, the optical element according to the first comparative example does not satisfy the condition (1). FIGS. 20-23 are graphs illustrating the relationships between the wavelength and the use efficiency of light achieved by the optical element according to the second comparative example.

Figure 20:
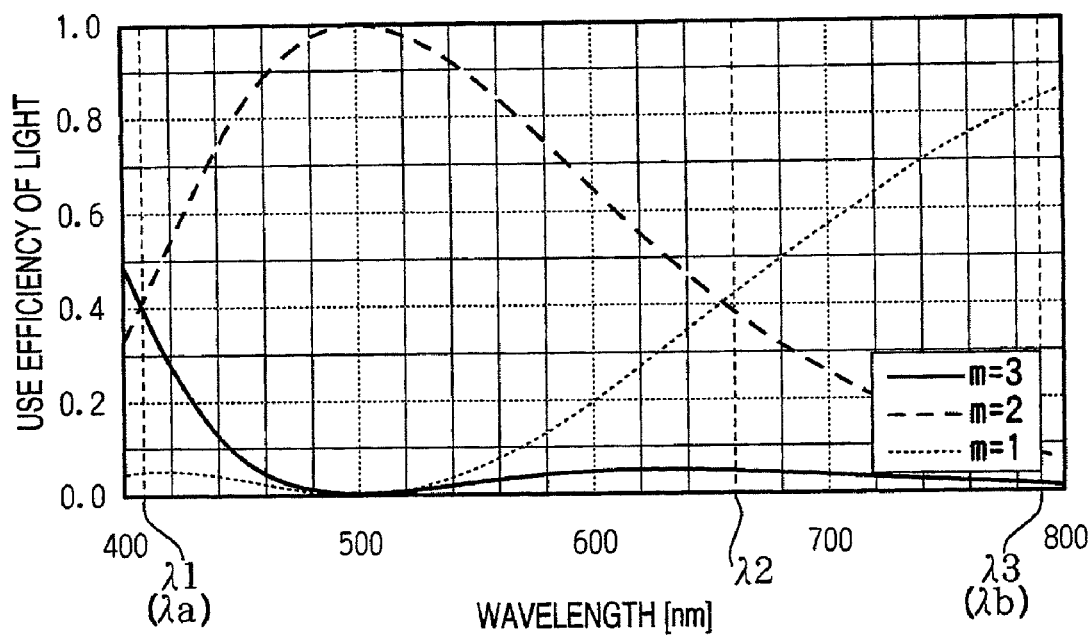
FIGS. 20-23 are graphs illustrating the relationship between the wavelength and the use efficiency of light achieved by an optical element according to a second comparative example.
Figure 21:
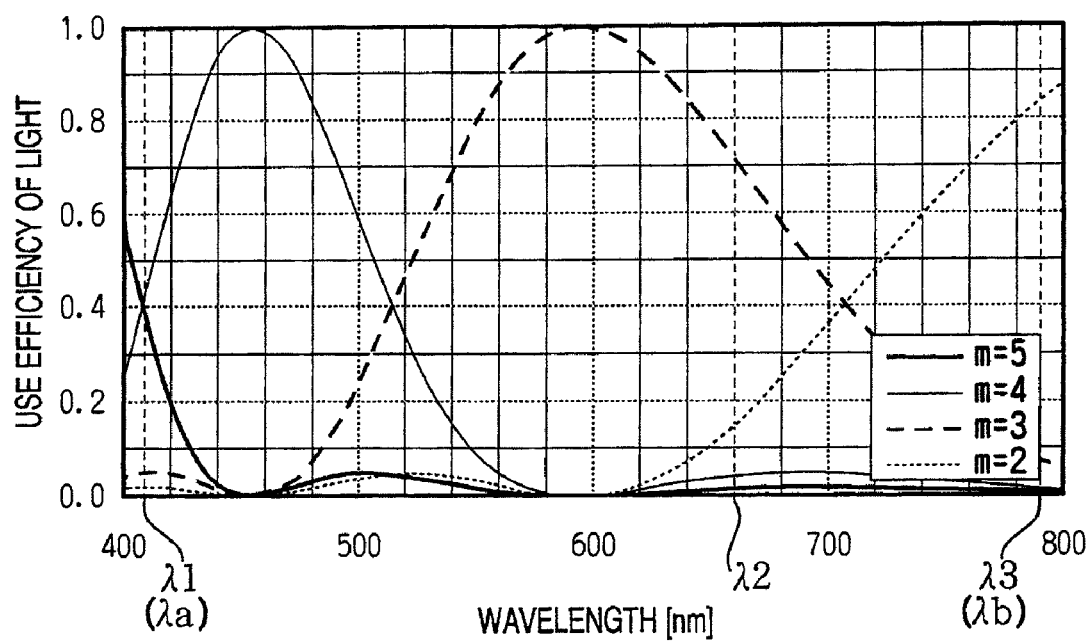
Figure 22:
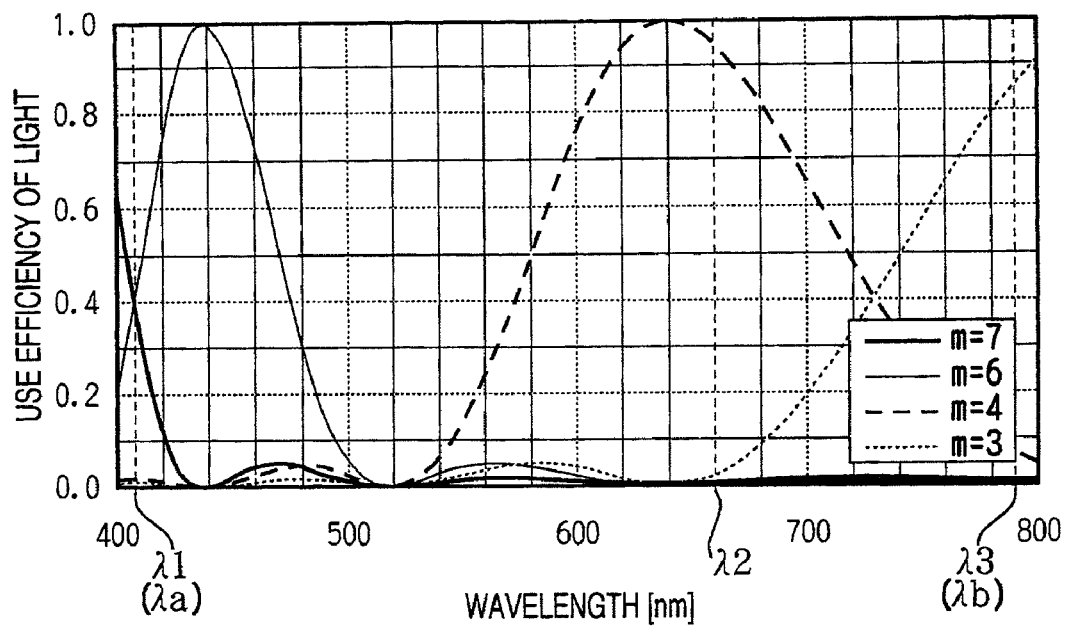
Figure 23:
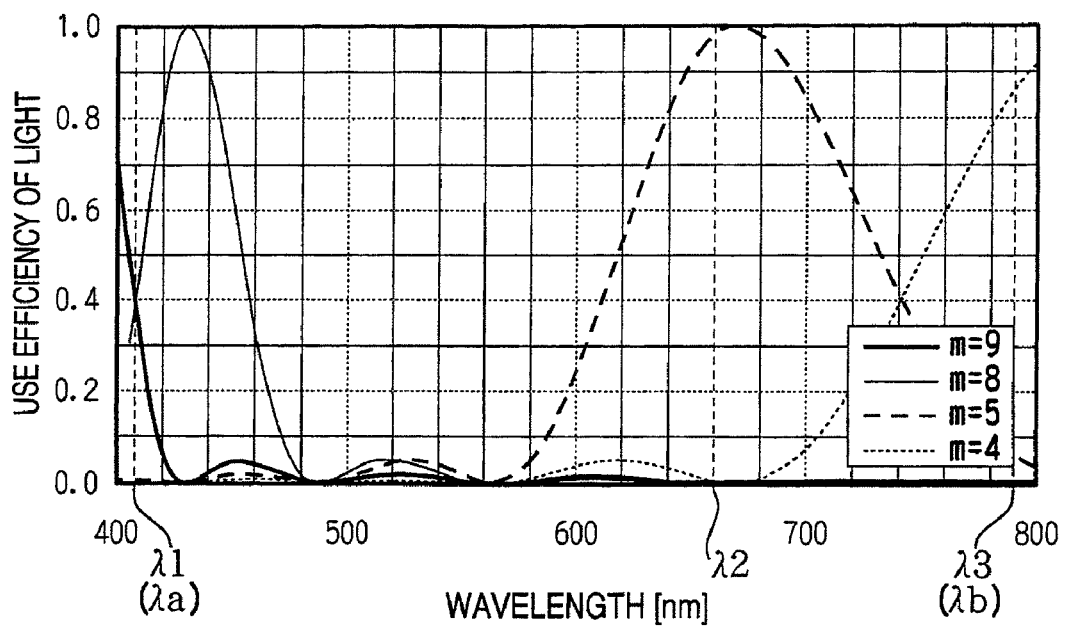

More specifically, FIG. 20 shows the case where the annular zone structure is designed such that the diffraction order at which the use efficiency of light of the firs laser beam is maximized is the third order. FIG. 21 shows the case where the annular zone structure is designed such that the diffraction order at which the use efficiency of light of the firs laser beam is maximized is the fifth order. FIG. 22 shows the case where the annular zone structure is designed such that the diffraction order at which the use efficiency of light of the firs laser beam is maximized is the seventh order. FIG. 23 shows the case where the annular zone structure is designed such that the diffraction order at which the use efficiency of light of the firs laser beam is maximized is the ninth order.

The annular zone structure of which diffraction order at which the use efficiency of light of the first laser beam is maximized is the third order is blazed at the wavelength of 349 nm. The annular zone structure of which diffraction order at which the use efficiency of light of the first laser beam is maximized is the fifth order is blazed at the wavelength of 372 nm. The annular zone structure of which diffraction order at which the use efficiency of light of the first laser beam is maximized is the seventh order is blazed at the wavelength of 382 nm. The annular zone structure of which diffraction order at which the use efficiency of light of the first laser beam is maximized is the ninth order is blazed at the wavelength of 388 nm. That is, the optical element according to the second comparative example does not satisfy the condition (2) in addition to not satisfying the condition (1).

As shown in FIGS. 16-19, regarding all of the above described configurations of the annular zone structures of the optical element according to the first comparative example, the use efficiency of light of the third laser beam is lower than that achieved by the optical element 20 according to the above described first or second production example.

As shown in FIGS. 20-23, the optical element according to the second comparative example exhibits the use efficiency of light of the third laser beam higher than that of the optical element according to the first comparative example, by shifting the blazed wavelength by a relatively large amount. However, the use efficiency of light of the first laser beam, required to be the highest, is lower than 50%.

Apparently, the objective optical system 30 employing the optical element 20 satisfying the above mentioned conditions exhibits the optical performance superior to the optical performance achieved by the objective optical system employing the optical element according to each of the first and second comparative examples.

Hereafter, sixteen concrete numerical examples of the optical element 20 capable of achieving the above described advantages of the first to third production examples of the optical element 20 are explained. Each of the numerical examples of the optical element 20 is provided with the annular zone structure formed by combining tow or three types of optical path difference functions.

More specifically, one of the three types of optical path difference functions exhibits a value of ($\Delta OPD/\lambda 1$) approximately equal to an odd multiple of the wavelength of the first laser beam. That is, one of the three types of optical path difference functions provides steps satisfying the condition (2) (or (20')), the condition (4) (or (4')), the condition (5) (or (5')), or the condition (6) (or (6')).

The numerical examples of the optical elements 20 are categorized into six groups A-F. Each of the first to third numerical examples (Tables 1 to 3) which are categorized as a group A is provided with a step satisfying the condition (2) (or (2')). The annular zone structure according to each of the first to third numerical examples shown in Tables 1 to 3 is formed by combining two types of optical path difference functions.

Each of the fourth to sixth numerical examples (Tables 4 to 6) which are categorized as a group B is provided with a step satisfying the condition (4) (or (4')). The annular zone structure according to each of the forth to sixth numerical examples shown in Tables 4 to 6 is formed by combining two types of optical path difference functions.

Each of the seventh to ninth numerical examples (Tables 7 to 9) which are categorized as a group C is provided with a step satisfying the condition (5) (or (5')). The annular zone structure according to each of the seventh to ninth numerical examples shown in Tables 7 to 9 is formed by combining two types of optical path difference functions.

Each of the tenth to twelfth numerical examples (Tables 10 to 12) which are categorized as a group D is provided with a step satisfying the condition (6) (or (6')). The annular zone structure according to each of the tenth to twelfth examples shown in Tables 10 to 12 is formed by combining two types of optical path difference functions.

Each of the thirteenth and fourteenth numerical examples (Tables 13 and 14) which are categorized as a group E is provided with a step satisfying the condition (5) (or (5')). The annular zone structure according to each of the thirteenth and fourteenth numerical examples shown in Tables 13 and 14 is formed by combining three types of optical path difference functions.

Each of the fifteenth to sixteenth numerical examples (Tables 15 and 16) which are categorized as a group F is provided with a step satisfying the condition (6) (or (6')). The annular zone structure according to each of the fifteenth to sixteenth numerical examples shown in Tables 15 and 16 is formed by combining three types of optical path difference functions.

In each of the groups A to F, the last numerical example (the numerical example 3, 6, 9, 12, 14 or 16) is configured such that ($\Delta$OPD/$\lambda$1) is adjusted to take a value other than an integral multiple of the wavelength of the first laser beam (or the wavelength of $\lambda$a). In Tables 1 to 16, "OPDF" means an optical path difference function.

TABLE 1

$n_d$ 2.144
$v_d$ 17.8

| OPDF | $\Delta$OPD/$\lambda$1 | Use Efficiency of Light (%) | | |
|---|---|---|---|---|
| | | $1^{st}$ Laser Beam | $2^{nd}$ Laser Beam | $3^{rd}$ Laser Beam |
| $1^{st}$ OPDF | 2.00 | 100 | 97 | 97 |
| $2^{nd}$ OPDF | 3.00 | 100 | 65 | 66 |
| TOTAL | | 100 | 63 | 64 |

TABLE 2

$n_d$ 1.585
$v_d$ 29.9

| OPDF | $\Delta$OPD/$\lambda$1 | Use Efficiency of Light (%) | | |
|---|---|---|---|---|
| | | $1^{st}$ Laser Beam | $2^{nd}$ Laser Beam | $3^{rd}$ Laser Beam |
| $1^{st}$ OPDF | 2.00 | 100 | 92 | 99 |
| $2^{nd}$ OPDF | 3.00 | 100 | 78 | 52 |
| TOTAL | | 100 | 72 | 52 |

TABLE 3

$n_d$ 1.585
$v_d$ 29.9

| OPDF | $\Delta$OPD/$\lambda$1 | Use Efficiency of Light (%) | | |
|---|---|---|---|---|
| | | $1^{st}$ Laser Beam | $2^{nd}$ Laser Beam | $3^{rd}$ Laser Beam |
| $1^{st}$ OPDF | 2.00 | 100 | 92 | 99 |
| $2^{nd}$ OPDF | 2.82 | 84 | 57 | 70 |
| TOTAL | | 84 | 53 | 70 |

TABLE 4

$n_d$ 2.144
$v_d$ 17.8

| OPDF | $\Delta$OPD/$\lambda$1 | Use Efficiency of Light (%) | | |
|---|---|---|---|---|
| | | $1^{st}$ Laser Beam | $2^{nd}$ Laser Beam | $3^{rd}$ Laser Beam |
| $1^{st}$ OPDF | 2.00 | 100 | 97 | 97 |
| $2^{nd}$ OPDF | 5.00 | 100 | 80 | 81 |
| TOTAL | | 100 | 77 | 78 |

TABLE 5

$n_d$ 1.585
$v_d$ 29.9

| OPDF | $\Delta$OPD/$\lambda$1 | Use Efficiency of Light (%) | | |
|---|---|---|---|---|
| | | $1^{st}$ Laser Beam | $2^{nd}$ Laser Beam | $3^{rd}$ Laser Beam |
| $1^{st}$ OPDF | 2.00 | 100 | 92 | 99 |
| $2^{nd}$ OPDF | 5.00 | 100 | 96 | 60 |
| TOTAL | | 100 | 88 | 60 |

TABLE 6

$n_d$ 1.585
$v_d$ 29.9

| OPDF | $\Delta$OPD/$\lambda$1 | Use Efficiency of Light (%) | | |
|---|---|---|---|---|
| | | $1^{st}$ Laser Beam | $2^{nd}$ Laser Beam | $3^{rd}$ Laser Beam |
| $1^{st}$ OPDF | 2.00 | 100 | 92 | 99 |
| $2^{nd}$ OPDF | 4.84 | 87 | 83 | 76 |
| TOTAL | | 87 | 77 | 75 |

TABLE 7

$n_d$ 2.144
$v_d$ 17.8

| OPDF | $\Delta$OPD/$\lambda$1 | Use Efficiency of Light (%) | | |
|---|---|---|---|---|
| | | $1^{st}$ Laser Beam | $2^{nd}$ Laser Beam | $3^{rd}$ Laser Beam |
| $1^{st}$ OPDF | 2.00 | 100 | 97 | 97 |
| $2^{nd}$ OPDF | 7.00 | 100 | 92 | 93 |
| TOTAL | | 100 | 89 | 90 |

TABLE 8

$n_d$ 1.585
$v_d$ 29.9

| OPDF | ΔOPD/λ1 | Use Efficiency of Light (%) | | |
|---|---|---|---|---|
| | | 1st Laser Beam | 2nd Laser Beam | 3rd Laser Beam |
| 1st OPDF | 2.00 | 100 | 92 | 99 |
| 2nd OPDF | 7.00 | 100 | 100 | 68 |
| TOTAL | | 100 | 92 | 68 |

TABLE 9

$n_d$ 1.585
$v_d$ 29.9

| OPDF | ΔOPD/λ1 | Use Efficiency of Light (%) | | |
|---|---|---|---|---|
| | | 1st Laser Beam | 2nd Laser Beam | 3rd Laser Beam |
| 1st OPDF | 2.00 | 100 | 92 | 99 |
| 2nd OPDF | 6.86 | 90 | 99 | 81 |
| TOTAL | | 90 | 91 | 80 |

TABLE 10

$n_d$ 2.144
$v_d$ 17.8

| OPDF | ΔOPD/λ1 | Use Efficiency of Light (%) | | |
|---|---|---|---|---|
| | | 1st Laser Beam | 2nd Laser Beam | 3rd Laser Beam |
| 1st OPDF | 2.00 | 100 | 97 | 97 |
| 2nd OPDF | 9.00 | 100 | 99 | 99 |
| TOTAL | | 100 | 96 | 95 |

TABLE 11

$n_d$ 1.585
$v_d$ 29.9

| OPDF | ΔOPD/λ1 | Use Efficiency of Light (%) | | |
|---|---|---|---|---|
| | | 1st Laser Beam | 2nd Laser Beam | 3rd Laser Beam |
| 1st OPDF | 2.00 | 100 | 92 | 99 |
| 2nd OPDF | 9.00 | 100 | 88 | 75 |
| TOTAL | | 100 | 82 | 75 |

TABLE 12

$n_d$ 1.585
$v_d$ 29.9

| OPDF | ΔOPD/λ1 | Use Efficiency of Light (%) | | |
|---|---|---|---|---|
| | | 1st Laser Beam | 2nd Laser Beam | 3rd Laser Beam |
| 1st OPDF | 2.00 | 100 | 92 | 99 |
| 2nd OPDF | 8.87 | 91 | 97 | 86 |
| TOTAL | | 91 | 90 | 86 |

TABLE 13

$n_d$ 1.606
$v_d$ 27.2

| OPDF | ΔOPD/λ1 | Use Efficiency of Light (%) | | |
|---|---|---|---|---|
| | | 1st Laser Beam | 2nd Laser Beam | 3rd Laser Beam |
| 1st OPDF | 2.00 | 100 | 94 | 99 |
| 2nd OPDF | 7.00 | 100 | 100 | 75 |
| 3rd OPDF | 10.00 | 100 | 75 | 73 |
| TOTAL | | 100 | 71 | 55 |

TABLE 14

$n_d$ 1.606
$v_d$ 27.2

| OPDF | ΔOPD/λ1 | Use Efficiency of Light (%) | | |
|---|---|---|---|---|
| | | 1st Laser Beam | 2nd Laser Beam | 3rd Laser Beam |
| 1st OPDF | 2.04 | 99 | 91 | 100 |
| 2nd OPDF | 6.87 | 90 | 96 | 87 |
| 3rd OPDF | 10.15 | 87 | 90 | 87 |
| TOTAL | | 78 | 79 | 75 |

TABLE 15

$n_d$ 1.606
$v_d$ 27.2

| OPDF | ΔOPD/λ1 | Use Efficiency of Light (%) | | |
|---|---|---|---|---|
| | | 1st Laser Beam | 2nd Laser Beam | 3rd Laser Beam |
| 1st OPDF | 2.00 | 100 | 94 | 99 |
| 2nd OPDF | 9.00 | 100 | 94 | 84 |
| 3rd OPDF | 10.00 | 100 | 75 | 73 |
| TOTAL | | 100 | 66 | 61 |

TABLE 16

$n_d$ 1.606
$v_d$ 27.2

| OPDF | ΔOPD/λ1 | Use Efficiency of Light (%) | | |
|---|---|---|---|---|
| | | 1st Laser Beam | 2nd Laser Beam | 3rd Laser Beam |
| 1st OPDF | 2.04 | 99 | 91 | 100 |
| 2nd OPDF | 8.89 | 92 | 99 | 92 |
| 3rd OPDF | 10.15 | 87 | 90 | 87 |
| TOTAL | | 80 | 81 | 80 |

Hereafter, four numerical configurations (first to fourth numerical configurations) of the optical information recording/reproducing device 100 employing the optical element 20 according to the embodiment are explained. The general block diagram of the optical information recording/reproducing device 100 according to each of the first to fourth numerical configurations is illustrated in FIG. 1. In the following, the explanation focuses on numerical configurations of the objective optical system 30 in the optical information recording/reproducing device 100 for the sake of simplicity.

First Numerical Configuration

The following Table 17 shows concrete specifications of the objective optical system 30 according to a first numerical configuration.

TABLE 17

|  | 1st laser beam | 2nd laser beam | 3rd laser beam |
|---|---|---|---|
| Wavelength (nm) | 408 | 660 | 790 |
| Focal Length (mm) | 2.353 | 2.415 | 2.426 |
| NA | 0.850 | 0.650 | 0.510 |
| Magnification M | 0.000 | 0.000 | 0.000 |

As indicated by the "Magnification M" in Table 17, the laser beam is incident upon the objective lens 10 as a collimated beam when each of the optical discs D1-D3 is used. With this configuration, it is possible to prevent the off-axis aberration from occurring during the tracking operation.

Table 18 shows a specific numerical configuration defined when the optical disc D1 is used in the optical information recording/reproducing device 100 provided with the objective optical system 30 shown in Table 17. The following Table 19 shows specific numerical configuration defined when the optical disc D2 is used in the optical information recording/reproducing device 100 provided with the objective optical system 30 shown in Table 17. The following Table 20 shows specific numerical configuration defined when the optical disc D3 is used in the optical information recording/reproducing device 100 provided with the objective optical system 30 shown in Table 17.

TABLE 18

| Surface No. | r | d | nd | vd |
|---|---|---|---|---|
| 0 |  | ∞ |  |  |
| 1 | ∞ | 1.000 | 1.606 | 27.2 |
| 2 | ∞ | 0.500 |  |  |
| 3 | 1.521 | 2.985 | 1.509 | 56.4 |
| 4 | −2.121 | 0.703 |  |  |
| 5 | ∞ | 0.100 | 1.585 | 29.9 |
| 6 | ∞ | — |  |  |

TABLE 19

| Surface No. | r | d | nd | vd |
|---|---|---|---|---|
| 0 |  | ∞ |  |  |
| 1 | ∞ | 1.000 | 1.606 | 27.2 |
| 2 | ∞ | 0.500 |  |  |
| 3 | 1.521 | 2.985 | 1.509 | 56.4 |
| 4 | −2.121 | 0.442 |  |  |
| 5 | ∞ | 0.600 | 1.585 | 29.9 |

TABLE 19-continued

| Surface No. | r | d | nd | vd |
|---|---|---|---|---|
| 6 | ∞ | — |  |  |

TABLE 20

| Surface No. | r | d | nd | vd |
|---|---|---|---|---|
| 0 |  | ∞ |  |  |
| 1 | ∞ | 1.000 | 1.606 | 27.2 |
| 2 | ∞ | 0.500 |  |  |
| 3 | 1.521 | 2.985 | 1.509 | 56.4 |
| 4 | −2.121 | 0.070 |  |  |
| 5 | ∞ | 1.200 | 1.585 | 29.9 |
| 6 | ∞ | — |  |  |

In the Tables 18-20, the surface #0 represents a light source, the surfaces #1 and #2 represent the first and second surfaces 21 and 22 of the optical element 20, respectively, the surfaces #3 and #4 represent the first and second surfaces 11 and 12 of the objective lens 10, and the surfaces #5 and #6 represent the protective layer and the record surface of the corresponding optical disc.

In Tables 18-20 (and in the following similar Tables), "r" denotes the curvature radius (mm) of each optical surface, and "d" denotes the thickness of an optical components or the distance (mm) from each optical surface to the next optical surface during the information reproduction/recordation.

Each of the first surface 21 (surface #1) of the optical element 20 and the first and second surfaces 11 and 12 (surfaces #3 and #4) of the objective lens 10 is an aspherical surface. The following Table 21 shows the cone constants κ and aspherical coefficients $A_{2i}$ specifying the shape of each of the first surface 21 (surface #1) of the optical element 20 and the first and second surfaces 11 and 12 (surfaces #3 and #4) of the objective lens 10. In Table 21 (and in the following similar Tables), the notation "E" means the power of 10 with an exponent specified by the number to the right of E (e.g. "E-04" means "$\times 10^{-4}$").

TABLE 21

| Surface No. | Area | κ | A4 | A6 | A8 | A10 |
|---|---|---|---|---|---|---|
| 1 | 1 | −1.0000 | −3.75740E−04 | −2.61640E−04 | 3.13590E−05 | 0.00000E+00 |
|  | 2 | −1.0000 | −5.78980E−04 | −3.81130E−05 | −2.90670E−05 | 0.00000E+00 |
|  | 3 | −1.0000 | −1.28020E−03 | 4.95970E−04 | −1.31310E−04 | 0.00000E+00 |
| 3 |  | −0.6600 | 5.38060E−03 | 2.86090E−03 | −4.38520E−03 | 6.37270E−03 |
| 4 |  | −1.0000 | 3.76820E−01 | −5.33270E−01 | 5.44180E−01 | −3.68210E−01 |

| Surface No. | Area | A12 | A14 | A16 | A18 | A20 |
|---|---|---|---|---|---|---|
| 1 | 1 | 0.00000E+00 | 0.00000E+00 | 0.00000E+00 | 0.00000E+00 | 0.00000E+00 |
|  | 2 | 0.00000E+00 | 0.00000E+00 | 0.00000E+00 | 0.00000E+00 | 0.00000E+00 |
|  | 3 | 0.00000E+00 | 0.00000E+00 | 0.00000E+00 | 0.00000E+00 | 0.00000E+00 |
| 3 |  | −5.11510E−03 | 2.48270E−03 | −7.19575E−04 | 1.14546E−04 | −7.68702E−06 |
| 4 |  | 1.57950E−01 | −4.06170E−02 | 5.36790E−03 | −1.66510E−04 | −2.27390E−05 |

As shown in Table 21, the first surface 21 (surface #1) of the optical element 20 includes a first area including the optical axis, a second area arranged outside the first area, and a third area arranged outside the second area. More specifically, the first area is a common area contributing to convergence of each of the first, second and third laser beams. The second area contributes to convergence of each of the first and second laser beams, but does not contribute to convergence of the third laser beam. In other words, the second area functions as an aperture stop for the third laser beam.

The third area is provided to secure the required numerical aperture for the optical disc (e.g., optical disc D1) which requires the largest numerical aperture (NA). The third area contributes to convergence of the first laser beam, but does not contribute to convergence of each of the second and third laser beams. In other words, the third area functions as an aperture stop for each of the second and third laser beams.

Each of the first to third areas has a function of suppressing the fluctuation of the spherical aberration caused when the wavelength of the laser beam being used shifts by a minute amount from an optimum wavelength.

To provide the above described different types of optical effects for the first and second areas, respectively, each of the first and second areas is designed independently to have a unique annular zone structure defined by at least two types of optical path difference functions.

Table 22 shows the coefficients $P_{2i}$ of the optical path difference function defining the annular zone structure of each of the first to third areas on the first surface 21 of the optical element 20. Table 23 shows the diffraction order m and an effective radius (height from the optical axis) for each of the first to third areas. In Tables 22 and 23 (and in the following similar tables), "OPDF" means an optical path difference function.

TABLE 22

| Surface No. | Area | OPDF | P2 | P4 | P6 |
|---|---|---|---|---|---|
| 1 | 1 | $1^{st}$ | 0.00000E+00 | 2.02890E+00 | 3.42340E−01 |
|   |   | $2^{nd}$ | 0.00000E+00 | 4.18700E+00 | 4.72050E−01 |
|   |   | $3^{rd}$ | 0.00000E+00 | −3.39730E+00 | −4.39690E−01 |
|   | 2 | $4^{th}$ | 0.00000E+00 | 9.08580E+00 | 8.35900E−01 |
|   |   | $5^{th}$ | 0.00000E+00 | −2.72760E+00 | −2.47430E−01 |
|   | 3 | $6^{th}$ | 0.00000E+00 | −2.03550E+00 | 7.88360E−01 |

| Surface No. | Area | OPDF | P8 | P10 | P12 |
|---|---|---|---|---|---|
| 1 | 1 | $1^{st}$ | 4.61550E−03 | 0.00000E+00 | 0.00000E+00 |
|   |   | $2^{nd}$ | 5.03270E−02 | 0.00000E+00 | 0.00000E+00 |
|   |   | $3^{rd}$ | −3.13190E−02 | 0.00000E+00 | 0.00000E+00 |
|   | 2 | $4^{th}$ | 2.03440E−01 | 0.00000E+00 | 0.00000E+00 |
|   |   | $5^{th}$ | −6.47440E−02 | 0.00000E+00 | 0.00000E+00 |
|   | 3 | $6^{th}$ | −2.08820E−01 | 0.00000E+00 | 0.00000E+00 |

TABLE 23

| Surface No. | Area | OPDF | $1^{st}$ laser beam | $2^{nd}$ laser beam | $3^{rd}$ laser beam | effective radius (mm) |
|---|---|---|---|---|---|---|
| 1 | 1 | $1^{st}$ | 2 | 1 | 1 | 1.237 |
|   |   | $2^{nd}$ | 7 | 4 | 3 |   |
|   |   | $3^{rd}$ | 10 | 6 | 5 |   |
|   | 2 | $4^{th}$ | 2 | 1 | — | 1.569 |
|   |   | $5^{th}$ | 7 | 4 | — |   |
|   | 3 | $6^{th}$ | 1 | — | — | 2.000 |

As shown in Tables 22 and 23, the first area of the first surface 21 of the optical element 20 has the annular zone structure having a shape defined by combining three types of optical path difference functions (i.e., the first, second and third optical path difference functions) which are different from each other, the second area of the first surface 21 has the annular zone structure having a shape defined by combining two types of optical path difference functions (i.e., the fourth and fifth optical path difference functions) which are different from each other, and the third area of the first surface 21 has the annular zone structure having a shape defined by the sixth optical path difference function.

Second Numerical Configuration

The following Table 24 shows concrete specifications of the objective optical system 30 according to a second numerical configuration.

TABLE 24

|   | $1^{st}$ laser beam | $2^{nd}$ laser beam | $3^{rd}$ laser beam |
|---|---|---|---|
| Wavelength (nm) | 408 | 660 | 790 |
| Focal Length (mm) | 2.353 | 2.415 | 2.426 |
| NA | 0.850 | 0.650 | 0.510 |
| Magnification M | 0.000 | 0.000 | 0.000 |

As indicated by the "Magnification M" in Table 24, the laser beam is incident upon the objective lens 10 as a collimated beam when each of the optical discs D1-D3 is used. With this configuration, it is possible to prevent the off-axis aberration from occurring during the tracking operation.

Table 25 shows a specific numerical configuration defined when the optical disc D1 is used in the optical information recording/reproducing device 100 provided with the objective optical system 30 shown in Table 24. The following Table 26 shows specific numerical configuration defined when the optical disc D2 is used in the optical information recording/reproducing device 100 provided with the objective optical system 30 shown in Table 24. The following Table 27 shows specific numerical configuration defined when the optical disc D3 is used in the optical information recording/reproducing device 100 provided with the objective optical system 30 shown in Table 24.

TABLE 25

| Surface No. | r | d | nd | vd |
|---|---|---|---|---|
| 0 |   | ∞ |   |   |
| 1 | ∞ | 1.000 | 1.606 | 27.2 |
| 2 | ∞ | 0.500 |   |   |
| 3 | 1.521 | 2.985 | 1.509 | 56.4 |
| 4 | −2.121 | 0.703 |   |   |
| 5 | ∞ | 0.100 | 1.585 | 29.9 |
| 6 | ∞ | — |   |   |

TABLE 26

| Surface No. | r | d | nd | vd |
|---|---|---|---|---|
| 0 |   | ∞ |   |   |
| 1 | ∞ | 1.000 | 1.606 | 27.2 |
| 2 | ∞ | 0.500 |   |   |
| 3 | 1.521 | 2.985 | 1.509 | 56.4 |
| 4 | −2.121 | 0.442 |   |   |
| 5 | ∞ | 0.600 | 1.585 | 29.9 |
| 6 | ∞ | — |   |   |

TABLE 27

| Surface No. | r | d | nd | vd |
|---|---|---|---|---|
| 0 | ∞ | ∞ | | |
| 1 | ∞ | 1.000 | 1.606 | 27.2 |
| 2 | ∞ | 0.500 | | |
| 3 | 1.521 | 2.985 | 1.509 | 56.4 |
| 4 | −2.121 | 0.070 | | |
| 5 | ∞ | 1.200 | 1.585 | 29.9 |
| 6 | ∞ | — | | |

In the Tables 25-27, the surface #0 represents a light source, the surfaces #1 and #2 represent the first and second surfaces 21 and 22 of the optical element 20, respectively, the surfaces #3 and #4 represent the first and second surfaces 11 and 12 of the objective lens 10, and the surfaces #5 and #6 represent the protective layer and the record surface of the corresponding optical disc.

Each of the first surface 21 (surface #1) of the optical element 20 and the first and second surfaces 11 and 12 (surfaces #3 and #4) of the objective lens 10 is an aspherical surface. The following Table 28 shows the cone constants κ and aspherical coefficients $A_{2i}$ specifying the shape of each of the first surface 21 (surface #1) of the optical element 20, and the first and second surfaces 11 and 12 (surfaces #3 and #4) of the objective lens 10.

TABLE 28

| Surface No. | Area | κ | A4 | A6 | A8 | A10 |
|---|---|---|---|---|---|---|
| 1 | 1 | −1.0000 | 5.15630E−02 | 6.43560E−03 | 6.00670E−04 | 0.00000E+00 |
|   | 2 | −1.0000 | −8.51870E−03 | −8.14570E−04 | −1.80720E−04 | 0.00000E+00 |
|   | 3 | −1.0000 | −8.72700E−03 | −6.07270E−04 | −3.28250E−04 | 0.00000E+00 |
| 3 |   | −0.6600 | 5.38060E−03 | 2.86090E−03 | −4.38520E−03 | 6.37270E−03 |
| 4 |   | −1.0000 | 3.76820E−01 | −5.33270E−01 | 5.44180E−01 | −3.68210E−01 |

| Surface No. | Area | A12 | A14 | A16 | A18 | A20 |
|---|---|---|---|---|---|---|
| 1 | 1 | 0.00000E+00 | 0.00000E+00 | 0.00000E+00 | 0.00000E+00 | 0.00000E+00 |
|   | 2 | 0.00000E+00 | 0.00000E+00 | 0.00000E+00 | 0.00000E+00 | 0.00000E+00 |
|   | 3 | 0.00000E+00 | 0.00000E+00 | 0.00000E+00 | 0.00000E+00 | 0.00000E+00 |
| 3 |   | −5.11510E−03 | 2.48270E−03 | −7.19575E−04 | 1.14546E−04 | −7.68702E−06 |
| 4 |   | 1.57950E−01 | −4.06170E−02 | 5.36790E−03 | −1.66510E−04 | −2.27390E−05 |

As shown in Table 28, the first surface 21 (surface #1) of the optical element 20 includes a first area including the optical axis, a second area arranged outside the first area, and a third area arranged outside the second area. More specifically, the first area is a common area contributing to convergence of each of the first, second and third laser beams. The second area contributes to convergence of each of the first and second laser beams, but does not contribute to convergence of the third laser beam. In other words, the second area functions as an aperture stop for the third laser beam.

The third area is provided to secure the required numerical aperture for the optical disc (e.g., optical disc D1) which requires the largest numerical aperture (NA). The third area contributes to convergence of the first laser beam, but does not contribute to convergence of each of the second and third laser beams. In other words, the third area functions as an aperture stop for each of the second and third laser beams.

Each of the first, second and third areas is designed separately to have a unique annular zone structure defined by at least one optical path difference function.

Table 29 shows the coefficients $P_{2i}$ of the optical path difference function defining the annular zone structure of each of the first to third areas on the first surface 21 of the optical element 20. Table 30 shows the diffraction order m and an effective radius (height from the optical axis) for each of the first to third areas.

TABLE 29

| Surface No. | Area | OPDF | P2 | P4 | P6 |
|---|---|---|---|---|---|
| 1 | 1 | $1^{st}$ | 0.00000E+00 | 9.11690E+00 | 1.13600E+00 |
|   | 2 | $2^{nd}$ | 0.00000E+00 | −4.51900E+00 | −4.31270E−01 |
|   | 3 | $3^{rd}$ | 0.00000E+00 | −1.38920E+01 | −9.61760E−01 |

| Surface No. | Area | OPDF | P8 | P10 | P12 |
|---|---|---|---|---|---|
| 1 | 1 | $1^{st}$ | 1.07130E−01 | 0.00000E+00 | 0.00000E+00 |
|   | 2 | $2^{nd}$ | −9.60100E−02 | 0.00000E+00 | 0.00000E+00 |
|   | 3 | $3^{rd}$ | −5.23070E−01 | 0.00000E+00 | 0.00000E+00 |

TABLE 30

| Surface No. | Area | OPDF | $1^{st}$ laser beam | $2^{nd}$ laser beam | $3^{rd}$ laser beam | effective radius (mm) |
|---|---|---|---|---|---|---|
| 1 | 1 | $1^{st}$ | 9 | 5 | 4 | 1.237 |
|   | 2 | $2^{nd}$ | 3 | 2 | — | 1.569 |
|   | 3 | $3^{rd}$ | 1 | — | — | 2.000 |

As shown in Tables 29 and 30, the first area of the first surface 21 of the optical element 20 has the annular zone structure having a shape defined by the first optical path difference function, the second area of the first surface 21 has the annular zone structure having a shape defined by the second optical path difference function, and the third area of the first surface 21 has the annular zone structure having a shape defined by the third optical path difference function.

Third Numerical Configuration

The following Table 31 shows concrete specifications of the objective optical system 30 according to a third numerical configuration.

TABLE 31

|  | 1st laser beam | 2nd laser beam | 3rd laser beam |
| --- | --- | --- | --- |
| Wavelength (nm) | 408 | 660 | 790 |
| Focal Length (mm) | 2.353 | 2.415 | 2.426 |
| NA | 0.850 | 0.650 | 0.510 |
| Magnification M | 0.000 | 0.000 | −0.205 |

As indicated by the "Magnification M" in Table 31, each of the first and second laser beams used for the optical discs D1 and D2 is incident upon the objective lens 10 as a collimated beam, while the third laser beam used for the optical disc D3 is incident upon the objective lens 10 as a diverging beam. With this configuration, it is possible to prevent the off-axis aberration from occurring during the tracking operation when each of the first and second laser beams for optical disc D1 and D2 is used. On the other hand, when the third laser beam is used, an adequate working distance can be secured for the optical disc D3.

Table 32 shows a specific numerical configuration defined when the optical disc D1 is used in the optical information recording/reproducing device 100 provided with the objective optical system 30 shown in Table 31. The following Table 33 shows specific numerical configuration defined when the optical disc D2 is used in the optical information recording/reproducing device 100 provided with the objective optical system 30 shown in Table 31. The following Table 34 shows specific numerical configuration defined when the optical disc D3 is used in the optical information recording/reproducing device 100 provided with the objective optical system 30 shown in Table 31.

TABLE 32

| Surface No. | r | d | nd | vd |
| --- | --- | --- | --- | --- |
| 0 |  | ∞ |  |  |
| 1 | ∞ | 1.000 | 1.606 | 27.2 |
| 2 | ∞ | 0.500 |  |  |
| 3 | 1.521 | 2.985 | 1.509 | 56.4 |
| 4 | −2.121 | 0.703 |  |  |
| 5 | ∞ | 0.100 | 1.585 | 29.9 |
| 6 | ∞ | — |  |  |

TABLE 33

| Surface No. | r | d | nd | vd |
| --- | --- | --- | --- | --- |
| 0 |  | ∞ |  |  |
| 1 | ∞ | 1.000 | 1.606 | 27.2 |
| 2 | ∞ | 0.500 |  |  |
| 3 | 1.521 | 2.985 | 1.509 | 56.4 |
| 4 | −2.121 | 0.442 |  |  |
| 5 | ∞ | 0.600 | 1.585 | 29.9 |
| 6 | ∞ | — |  |  |

TABLE 34

| Surface No. | r | d | nd | vd |
| --- | --- | --- | --- | --- |
| 0 |  | −12.000 |  |  |
| 1 | ∞ | 1.000 | 1.606 | 27.2 |
| 2 | ∞ | 0.500 |  |  |
| 3 | 1.521 | 2.985 | 1.509 | 56.4 |
| 4 | −2.121 | 0.567 |  |  |
| 5 | ∞ | 1.200 | 1.585 | 29.9 |
| 6 | ∞ | — |  |  |

In the Tables 32-34, the surface #0 represents a light source, the surfaces #1 and #2 represent the first and second surfaces 21 and 22 of the optical element 20, respectively, the surfaces #3 and #4 represent the first and second surfaces 11 and 12 of the objective lens 10, and the surfaces #5 and #6 represent the protective layer and the record surface of the corresponding optical disc.

Each of the first surface 21 (surface #1) of the optical element 20 and the first and second surfaces 11 and 12 (surfaces #3 and #4) of the objective lens 10 is an aspherical surface. The following Table 35 shows the cone constants κ and aspherical coefficients $A_{2i}$ specifying the shape of each of the first surface 21 (surface #1) of the optical element 20, and the first and second surfaces 11 and 12 (surfaces #3 and #4) of the objective lens 10.

TABLE 35

| Surface No. | Area | κ | A4 | A6 | A8 | A10 |
| --- | --- | --- | --- | --- | --- | --- |
| 1 | 1 | −1.0000 | 1.07120E−01 | −6.45420E−02 | 1.88850E−02 | −6.86130E−03 |
|  | 2 | −1.0000 | −8.51870E−03 | −8.14570E−04 | −1.80720E−04 | 0.00000E+00 |
|  | 3 | −1.0000 | −8.72700E−03 | −6.07270E−04 | −3.28250E−04 | 0.00000E+00 |
| 3 |  | −0.6600 | 5.38060E−03 | 2.86090E−03 | −4.38520E−03 | 6.37270E−03 |
| 4 |  | −1.0000 | 3.76820E−01 | −5.33270E−01 | 5.44180E−01 | −3.68210E−01 |

| Surface No. | Area | A12 | A14 | A16 | A18 | A20 |
| --- | --- | --- | --- | --- | --- | --- |
| 1 | 1 | 0.00000E+00 | 0.00000E+00 | 0.00000E+00 | 0.00000E+00 | 0.00000E+00 |
|  | 2 | 0.00000E+00 | 0.00000E+00 | 0.00000E+00 | 0.00000E+00 | 0.00000E+00 |
|  | 3 | 0.00000E+00 | 0.00000E+00 | 0.00000E+00 | 0.00000E+00 | 0.00000E+00 |
| 3 |  | −5.11510E−03 | 2.48270E−03 | −7.19575E−04 | 1.14546E−04 | −7.68702E−06 |
| 4 |  | 1.57950E−01 | −4.06170E−02 | 5.36790E−03 | −1.66510E−04 | −2.27390E−05 |

As shown in Table 35, the first surface 21 (surface #1) of the optical element 20 includes a first area including the optical axis, a second area arranged outside the first area, and a third area arranged outside the second area. More specifically, the first area is a common area contributing to convergence of each of the first, second and third laser beams. The second area contributes to convergence of each of the first and second laser beams, but does not contribute to convergence of the third laser beam. In other words, the second area functions as an aperture stop for the third laser beam.

The third area is provided to secure the required numerical aperture for the optical disc (e.g., optical disc D1) which requires the largest numerical aperture (NA). The third area contributes to convergence of the first laser beam, but does not contribute to convergence of each of the second and third laser beams. In other words, the third area functions as an aperture stop for each of the second and third laser beams.

Each of the first to third areas has a function of suppressing the fluctuation of the spherical aberration caused when the wavelength of the laser beam being used shifts by a minute amount from an optimum wavelength.

To provide the above described optical effect for the first area, the first area is designed to have a unique annular zone structure defined by at least two types of optical path difference functions.

Table 36 shows the coefficients $P_{2i}$ of the optical path difference function defining the annular zone structure of each of the first to third areas on the first surface 21 of the optical element 20. Table 37 shows the diffraction order m and an effective radius (height from the optical axis) for each of the first to third areas.

TABLE 36

| Surface No. | Area | OPDF | P2 | P4 | P6 |
|---|---|---|---|---|---|
| 1 | 1 | $1^{st}$ | 0.00000E+00 | 5.25040E+01 | −2.85900E+01 |
|   |   | $2^{nd}$ | 0.00000E+00 | 2.18070E+01 | −1.51650E+01 |
|   | 2 | $3^{rd}$ | 0.00000E+00 | −4.51900E+00 | −4.31270E−01 |
|   | 3 | $4^{th}$ | 0.00000E+00 | −1.38920E+01 | −9.61760E−01 |

| Surface No. | Area | OPDF | P8 | P10 | P12 |
|---|---|---|---|---|---|
| 1 | 1 | $1^{st}$ | 8.38960E+00 | −3.06450E+00 | 0.00000E+00 |
|   |   | $2^{nd}$ | 4.42090E+00 | −1.59610E+00 | 0.00000E+00 |
|   | 2 | $3^{rd}$ | −9.60100E−02 | 0.00000E+00 | 0.00000E+00 |
|   | 3 | $4^{th}$ | −5.23070E−01 | 0.00000E+00 | 0.00000E+00 |

TABLE 37

| Surface No. | Area | OPDF | $1^{st}$ laser beam | $2^{nd}$ laser beam | $3^{rd}$ laser beam | effective radius (mm) |
|---|---|---|---|---|---|---|
| 1 | 1 | $1^{st}$ | 2 | 1 | 1 | 1.260 |
|   |   | $2^{nd}$ | 3 | 2 | 1 |   |
|   | 2 | $3^{rd}$ | 3 | 2 | — | 1.569 |
|   | 3 | $4^{th}$ | 1 | — | — | 2.000 |

As shown in Tables 36 and 37, the first area of the first surface 21 of the optical element 20 has the annular zone structure having a shape defined by combining two types of optical path difference functions (the first and second optical path difference functions) which are different from each other, the second area of the first surface 21 has the annular zone structure having a shape defined by the third optical path difference function, and the third area of the first surface 21 has the annular zone structure having a shape defined by the fourth optical path difference function.

Fourth Numerical Configuration

The following Table 38 shows concrete specifications of the objective optical system 30 according to a fourth numerical configuration.

TABLE 38

|   | $1^{st}$ laser beam | $2^{nd}$ laser beam | $3^{rd}$ laser beam |
|---|---|---|---|
| Wavelength (nm) | 408 | 660 | 790 |
| Focal Length (mm) | 2.353 | 2.415 | 2.426 |
| NA | 0.850 | 0.650 | 0.510 |
| Magnification M | 0.000 | 0.000 | −0.205 |

As indicated by the "Magnification M" in Table 38, each of the first and second laser beams used for the optical discs D1 and D2 is incident upon the objective lens 10 as a collimated beam, while the third laser beam used for the optical disc D3 is incident upon the objective lens 10 as a diverging beam. With this configuration, it is possible to prevent the off-axis aberration from occurring during the tracking operation when each of the first and second laser beams for optical disc D1 and D2 is used. On the other hand, when the third laser beam is used, an adequate working distance can be secured for the optical disc D3.

Table 39 shows a specific numerical configuration defined when the optical disc D1 is used in the optical information recording/reproducing device 100 provided with the objective optical system 30 shown in Table 38. The following Table 40 shows specific numerical configuration defined when the optical disc D2 is used in the optical information recording/reproducing device 100 provided with the objective optical system 30 shown in Table 31. The following Table 41 shows specific numerical configuration defined when the optical disc D3 is used in the optical information recording/reproducing device 100 provided with the objective optical system 30 shown in Table 38.

TABLE 39

| Surface No. | r | d | nd | vd |
|---|---|---|---|---|
| 0 |   | ∞ |   |   |
| 1 | ∞ | 1.000 | 1.606 | 27.2 |
| 2 | ∞ | 0.500 |   |   |
| 3 | 1.521 | 2.985 | 1.509 | 56.4 |
| 4 | −2.121 | 0.703 |   |   |
| 5 | ∞ | 0.100 | 1.585 | 29.9 |
| 6 | ∞ | — |   |   |

TABLE 40

| Surface No. | r | d | nd | vd |
|---|---|---|---|---|
| 0 |   | ∞ |   |   |
| 1 | ∞ | 1.000 | 1.606 | 27.2 |
| 2 | ∞ | 0.500 |   |   |
| 3 | 1.521 | 2.985 | 1.509 | 56.4 |
| 4 | −2.121 | 0.442 |   |   |
| 5 | ∞ | 0.600 | 1.585 | 29.9 |
| 6 | ∞ | — |   |   |

TABLE 41

| Surface No. | r | d | nd | vd |
|---|---|---|---|---|
| 0 | | −12.000 | | |
| 1 | ∞ | 1.000 | 1.606 | 27.2 |
| 2 | ∞ | 0.500 | | |
| 3 | 1.521 | 2.985 | 1.509 | 56.4 |
| 4 | −2.121 | 0.567 | | |
| 5 | ∞ | 1.200 | 1.585 | 29.9 |
| 6 | ∞ | — | | |

In the Tables 39-41, the surface #0 represents a light source, the surfaces #1 and #2 represent the first and second surfaces 21 and 22 of the optical element 20, respectively, the surfaces #3 and #4 represent the first and second surfaces 11 and 12 of the objective lens 10, and the surfaces #5 and #6 represent the protective layer and the record surface of the corresponding optical disc.

Each of the first surface 21 (surface #1) of the optical element 20 and the first and second surfaces 11 and 12 (surfaces #3 and #4) of the objective lens 10 is an aspherical surface: The following Table 42 shows the cone constants κ and aspherical coefficients $A_{2i}$ specifying the shape of each of the first surface 21 (surface #1) of the optical element 20, and the first and second surfaces 11 and 12 (surfaces #3 and #4) of the objective lens 10.

TABLE 42

| Surface No. | Area | κ | A4 | A6 | A8 | A10 |
|---|---|---|---|---|---|---|
| 1 | 1 | −1.0000 | 1.07390E−01 | −6.53330E−02 | 1.96970E−02 | −7.15980E−03 |
| | 2 | −1.0000 | −8.51870E−03 | −8.14570E−04 | −1.80720E−04 | 0.00000E+00 |
| | 3 | −1.0000 | −8.72700E−03 | −6.07270E−04 | −3.28250E−04 | 0.00000E+00 |
| 3 | | −0.6600 | 5.38060E−03 | 2.86090E−03 | −4.38520E−03 | 6.37270E−03 |
| 4 | | −1.0000 | 3.76820E−01 | −5.33270E−01 | 5.44180E−01 | −3.68210E−01 |

| Surface No. | Area | A12 | A14 | A16 | A18 | A20 |
|---|---|---|---|---|---|---|
| 1 | 1 | 0.00000E+00 | 0.00000E+00 | 0.00000E+00 | 0.00000E+00 | 0.00000E+00 |
| | 2 | 0.00000E+00 | 0.00000E+00 | 0.00000E+00 | 0.00000E+00 | 0.00000E+00 |
| | 3 | 0.00000E+00 | 0.00000E+00 | 0.00000E+00 | 0.00000E+00 | 0.00000E+00 |
| 3 | | −5.11510E−03 | 2.48270E−03 | −7.19575E−04 | 1.14546E−04 | −7.68702E−06 |
| 4 | | 1.57950E−01 | −4.06170E−02 | 5.36790E−03 | −1.66510E−04 | −2.27390E−05 |

As shown in Table 42, the first surface 21 (surface #1) of the optical element 20 includes a first area including the optical axis, a second area arranged outside the first area, and a third area arranged outside the second area. More specifically, the first area is a common area contributing to convergence of each of the first, second and third laser beams. The second area contributes to convergence of each of the first and second laser beams, but does not contribute to convergence of the third laser beam. In other words, the second area functions as an aperture stop for the third laser beam.

The third area is provided to secure the required numerical aperture for the optical disc (optical disc D1) which requires the largest numerical aperture (NA). The third area contributes to convergence of the first laser beam, but does not contribute to convergence of each of the second and third laser beams. In other words, the third area functions as an aperture stop for each of the second and third laser beams.

Each of the first to third areas has a function of suppressing the fluctuation of the spherical aberration caused when the wavelength of the laser beam being used shifts by a minute amount from an optimum wavelength.

To provide the above described optical effect for the first area, the first area is designed to have a unique annular zone structure defined by at least two types of optical path difference functions.

Table 43 shows the coefficients $P_{2i}$ of the optical path difference function defining the annular zone structure of each of the first to third areas on the first surface 21 of the optical element 20. Table 44 shows the diffraction order m and an effective radius (height from the optical axis) for each of the first to third areas.

TABLE 43

| Surface No. | Area | OPDF | P2 | P4 | P6 |
|---|---|---|---|---|---|
| 1 | 1 | $1^{st}$ | 0.00000E+00 | 3.07990E+01 | −1.37180E+01 |
| | | $2^{nd}$ | 0.00000E+00 | 2.18520E+01 | −1.53000E+01 |
| | 2 | $3^{rd}$ | 0.00000E+00 | −4.51900E+00 | −4.31270E−01 |
| | 3 | $4^{th}$ | 0.00000E+00 | −1.38920E+01 | −9.61760E−01 |

| Surface No. | Area | OPDF | P8 | P10 | P12 |
|---|---|---|---|---|---|
| 1 | 1 | $1^{st}$ | 4.25200E+00 | −1.56370E+00 | 0.00000E+00 |
| | | $2^{nd}$ | 4.56690E+00 | −1.65330E+00 | 0.00000E+00 |

TABLE 43-continued

| | 2 | $3^{rd}$ | −9.60100E−02 | 0.00000E+00 | 0.00000E+00 |
|---|---|---|---|---|---|
| | 3 | $4^{th}$ | −5.23070E−01 | 0.00000E+00 | 0.00000E+00 |

TABLE 44

| Surface No. | Area | OPDF | $1^{st}$ laser beam | $2^{nd}$ laser beam | $3^{rd}$ laser beam | effective radius (mm) |
|---|---|---|---|---|---|---|
| 1 | 1 | $1^{st}$ | 2 | 1 | 1 | 1.260 |
| | | $2^{nd}$ | 5 | 3 | 2 | |
| | 2 | $3^{rd}$ | 3 | 2 | — | 1.569 |
| | 3 | $4^{th}$ | 1 | — | — | 2.000 |

As shown in Tables 43 and 44, the first area of the first surface 21 of the optical element 20 has the annular zone structure having a shape defined by combining two types of optical path difference functions (the first and second optical path difference functions) which are different from each other, the second area of the first surface 21 has the annular zone structure having a shape defined by the third optical path difference function, and the third area of the first surface 21 has the annular zone structure having a shape defined by the fourth optical path difference function.

By forming the above described annular zone structure (shown in Tables 22, 23, 29, 30, 36, 37 43 and 44) satisfying the above described conditions at least on the first area of the optical element 20, the optical element 20 is able to achieve adequate optical performance for providing the above described advantages of the embodiment.

Regarding the above described four numerical configurations of the optical information recording/reproducing device 100, the first, second and third wavelengths $\lambda 1$, $\lambda 2$ and $\lambda 3$ satisfy conditions $1.6 < \lambda 2/\lambda 1 < 1.8$ and $1.8 < \lambda 3/\lambda 1 < 2.0$. The protective layer thicknesses satisfy conditions $5 < t2/t1 < 7$ and $11 < t3/t1 < 15$.

Although the present invention has been described in considerable detail with reference to certain preferred embodiments thereof, other embodiments are possible.

In the above described embodiment, the objective optical system 30 is designed such that the material having a high degree of dispersion is used for the optical element 20. However, the objective lens 30 may be made of the material having a high degree of dispersion. In this case, the optical information recording/reproducing device is designed such that the chromatic aberration caused by employing the objective lens 30 made of the material having a high degree of dispersion is corrected appropriately. For example, appropriate correction of the chromatic aberration can be achieved by employing a dedicated optical element for correcting the chromatic aberration, such as an element formed by cementing together a pair of positive and negative lenses made of materials having different degrees of dispersion. In a particular case, the annular zone structure may be provided on an optical element having a function as an objective lens converging each of the first to third laser beams onto the record surface of corresponding one of the optical discs D1 to D3.

This application claims priority of Japanese Patent Application No. P2007-214399, filed on Aug. 21, 2007. The entire subject matter of the application is incorporated herein by reference.

What is claimed is:

1. An objective optical system used for an optical information recording/reproducing device for recording information to and/or reproducing information from at least two types of optical discs, by selectively using one of two types of light beams including a first light beam having a first wavelength $\lambda a$ (nm) and a second light beam having a second wavelength $\lambda b$ (nm), the at least two types of optical discs including an optical disc Da for which information recording or information reproducing is executed by using the first light beam and an optical disc Db for which information recording or information reproducing is executed by using the second light beam, the first and second wavelengths $\lambda a$ and $\lambda b$ satisfying a condition:

$1.8 < \lambda b/\lambda a < 2.0$, when protective layer thicknesses of the optical discs Da and Db are represented by ta (mm) and tb (mm), respectively, the protective layer thicknesses satisfying a condition of ta<tb, when numerical apertures required for information reproducing or information recording on the optical discs Da and Db are defined as NAa and NAb, respectively, the numerical apertures satisfying a relationship NAa>NAb, the objective optical system comprising:

an optical element configured to have an annular zone structure on at least one surface of the optical element, the annular zone structure including a plurality of annular zones configured to have at least one step formed, at a boundary between adjacent ones of the plurality of annular zones, to extend in a direction of an optical axis of the objective optical system, the at least one step being provided to cause a predetermined optical path length difference between a light beam passing through an outside of the boundary and a light beam passing through an inside of the boundary, the predetermined optical path length difference given to the first light beam by the at least one step being approximately equal to an odd multiple of the first wavelength $\lambda a$, Abbe number of material of the optical element satisfying a condition of $15 < vd < 35$.

2. The objective optical system according to claim 1, wherein:

the predetermined optical path length difference given to the first light beam by the at least one step is approximately three times as large as the first wavelength $\lambda a$; and the Abbe number of the material of the optical element satisfies a condition of $15 < vd < 30$.

3. The objective optical system according to claim 2, wherein when the predetermined optical path length difference given to the first light beam by the at least one step is represented by $\Delta OPD$ (nm), the optical element satisfies a condition $2.8 \leq \Delta OPD/\lambda a \leq 3.3$.

4. The objective optical system according to claim 1, wherein:

the predetermined optical path length difference given to the first light beam by the at least one step is approximately five times as large as the first wavelength $\lambda a$; and the Abbe number of the material of the optical element satisfies a condition of $15 < vd < 30$.

5. The objective optical system according to claim 4, wherein when the predetermined optical path length difference given to the first light beam by the at least one step is represented by $\Delta OPD$ (nm), the optical element satisfies a condition $4.8 \leq \Delta OPD/\lambda a \leq 5.3$.

6. The objective optical system according to claim 1, wherein the predetermined optical path length difference given to the first light beam by the at least one step is approximately seven times as large as the first wavelength $\lambda a$.

7. The objective optical system according to claim 6, wherein when the predetermined optical path length difference given to the first light beam by the at least one step is represented by $\Delta OPD$ (nm), the optical element satisfies a condition $6.8 \leq \Delta OPD/\lambda a \leq 7.3$.

8. The objective optical system according to claim 1, wherein the predetermined optical path length difference given to the first light beam by the at least one step is approximately nine times as large as the first wavelength $\lambda a$.

9. The objective optical system according to claim 8, wherein when the predetermined optical path length difference given to the first light beam by the at least one step is represented by $\Delta OPD$ (nm), the optical element satisfies a condition $8.8 \leq \Delta OPD/\lambda a \leq 9.3$.

10. The objective optical system according to claim 1, wherein the material of the optical element includes resin.

11. The objective optical system according to claim 1, wherein the optical element is configured such that refracting effect of the optical element with respect to the first light beam having the first wavelength λa and an effect given by the annular zone structure cancel with respect to each other to have power of substantially zero with respect to the first light beam having the first wavelength λa.

12. The objective optical system according to claim 11, further comprising an objective lens located between the optical element and an optical disc being used,
wherein the objective lens converges each of the first and second light beams onto a record surface of corresponding one of the optical discs Da and Db.

13. The objective optical system according to claim 1, wherein the optical element is an objective lens which converges each of the first and second light beams onto a record surface of corresponding one of the optical discs Da and Db.

14. The objective optical system according to claim 1, wherein the annular zone structure is formed in an area securing the numerical aperture NAb required for information recording or information reproducing for the optical disc Db, on the at least one surface of the optical element.

15. The objective optical system according to claim 1, wherein each of the first and second light beams is incident on the objective optical system as a substantially collimated beam.

16. An optical information recording/reproducing device for recording information to and/or reproducing information from at least two types of optical discs, by selectively using one of two types of light beams including a first light beam having a first wavelength λa (nm) and a second light beam having a second wavelength λb (nm),
the at least two types of optical discs including an optical disc Da for which information recording or information reproducing is executed by using the first light beam and an optical disc Db for which information recording or information reproducing is executed by using the second light beam,
the first and second wavelengths λa and λb satisfying a condition:

$1.8 < \lambda b/\lambda a < 2.0$, when protective layer thicknesses of the optical discs Da and Db are represented by ta (mm) and tb (mm), respectively, the protective layer thicknesses satisfying a condition of ta<tb,
when numerical apertures required for information reproducing or information recording on the optical discs Da and Db are defined as NAa and NAb, respectively, the numerical apertures satisfying a relationship NAa>NAb,
the optical information recording/reproducing device comprising:
light sources respectively emitting the first and the second light beams; and
an objective optical system,
wherein the objective optical system includes an optical element configured to have an annular zone structure on at least one surface of the optical element,
the annular zone structure including a plurality of annular zones configured to have at least one step formed, at a boundary between adjacent ones of the plurality of annular zones, to extend in a direction of an optical axis of the objective optical system,
the at least one step being provided to cause a predetermined optical path length difference between a light beam passing through an outside of the boundary and a light beam passing through an inside of the boundary,
the predetermined optical path length difference given to the first light beam by the at least one step being approximately equal to an odd multiple of the first wavelength λa,
Abbe number of material of the optical element satisfying a condition of 15<vd<35.

17. An objective optical system used for an optical information recording/reproducing device for recording information to and/or reproducing information from at least three types of optical discs, by selectively using one of three types of light beams including a first light beam having a first wavelength λ1 (nm), a second light beam having a second wavelength λ2 (nm) and a third light beam having a third wavelength λ3 (nm),
the at least three types of optical discs including a first optical disc for which information recording or information reproducing is executed by using the first light beam, a second optical disc for which information recording or information reproducing is executed by using the second light beam, and a third optical disc for which information recording or information reproducing is executed by using the third light beam,
the first, second and third wavelengths λ1, λ2 and λ3 satisfying conditions:

$\lambda 1 < \lambda 2 < \lambda 3$; and $1.8 < \lambda 3/\lambda 1 < 2.0$, when protective layer thicknesses of the first, second and third optical discs are represented by t1 (mm), t2 (mm) and t3 (mm), respectively, the protective layer thicknesses satisfying a condition of t1≦t2<t3,
when numerical apertures required for information reproducing or information recording on the first, second and third optical discs are defined as NA1, NA2 and NA3, respectively, the numerical apertures satisfying following relationships:

(NA1>NA3); and (NA2>NA3), the objective optical system comprising:
an optical element configured to have an annular zone structure on at least one surface of the optical element,
the annular zone structure including a plurality of annular zones configured to have at least one step formed, at a boundary between adjacent ones of the plurality of annular zones, to extend in a direction of an optical axis of the objective optical system,
the at least one step being provided to cause a predetermined optical path length difference between a light beam passing through an outside of the boundary and a light beam passing through an inside of the boundary,
the predetermined optical path length difference given to the first light beam by the at least one step being approximately equal to an odd multiple of the first wavelength λ1,
Abbe number of material of the optical element satisfying a condition of 15<vd<35.

18. The objective optical system according to claim 17, wherein:
the predetermined optical path length difference given to the first light beam by the at least one step is approximately three times as large as the first wavelength λ1; and the Abbe number of the material of the optical element satisfies a condition of 15<vd<30.

19. The objective optical system according to claim 18, wherein when the predetermined optical path length difference given to the first light beam by the at least one step is represented by ΔOPD (nm), the optical element satisfies a condition 2.8≦ΔOPD/λ1≦3.3.

20. The objective optical system according to claim 17, wherein:
the predetermined optical path length difference given to the first light beam by the at least one step is approximately five times as large as the first wavelength λ1; and
the Abbe number of the material of the optical element satisfies a condition of 15<vd<30.

21. The objective optical system according to claim 20, wherein when the predetermined optical path length difference given to the first light beam by the at least one step is represented by ΔOPD (nm), the optical element satisfies a condition 4.8≦ΔOPD/λ1≦5.3.

22. The objective optical system according to claim 17, wherein the predetermined optical path length difference given to the first light beam by the at least one step is approximately seven times as large as the first wavelength λ1.

23. The objective optical system according to claim 22, wherein when the predetermined optical path length difference given to the first light beam by the at least one step is represented by ΔOPD (nm), the optical element satisfies a condition 6.8≦ΔOPD/λ1≦7.3.

24. The objective optical system according to claim 17, wherein the predetermined optical path length difference given to the first light beam by the at least one step is approximately nine times as large as the first wavelength λ1.

25. The objective optical system according to claim 24, wherein when the predetermined optical path length difference given to the first light beam by the at least one step is represented by ΔOPD (nm), the optical element satisfies a condition 8.8≦ΔOPD/λ1≦9.3.

26. The objective optical system according to claim 25, wherein the first, second and third wavelengths λ1, λ2 and λ3 satisfy conditions:

1.6<λ2/λ1<1.8; and 1.8<λ3/λ1<2.0, wherein the protective layer thicknesses t1, t2 and t3 satisfy conditions:

5<t2/t1<7; and

11<t3/t1<15, wherein each of the first, second and third light beams is incident on the objective optical system as a substantially collimated beam.

27. The objective optical system according to claim 17, wherein the material of the optical element includes resin.

28. The objective optical system according to claim 17, wherein the optical element is configured such that refracting effect of the optical element with respect to the first light beam having the first wavelength λ1 and an effect given by the annular zone structure cancel with respect to each other to have power of substantially zero with respect to the first light beam having the first wavelength λ1.

29. The objective optical system according to claim 28, further comprising an objective lens located between the optical element and an optical disc being used,
wherein the objective lens converges each of the first, second and third light beams onto a record surface of corresponding one of the first, second and third optical discs.

30. The objective optical system according to claim 17, wherein the optical element is an objective lens which converges each of the first, second and third light beams onto a record surface of corresponding one of the first, second and third optical discs.

31. The objective optical system according to claim 17, wherein the annular zone structure is formed in an area securing the numerical aperture NA3 required for information recording or information reproducing for the third optical disc, on the at least one surface of the optical element.

32. The objective optical system according to claim 17, wherein each of the first, second and third light beams is incident on the objective optical system as a substantially collimated beam.

33. An optical information recording/reproducing device for recording information to and/or reproducing information from at least three types of optical discs, by selectively using one of three types of light beams including a first light beam having a first wavelength λ1 (nm), a second light beam having a second wavelength λ2 (nm) and a third light beam having a third wavelength λ3 (nm),
the at least three types of optical discs including a first optical disc for which information recording or information reproducing is executed by using the first light beam, a second optical disc for which information recording or information reproducing is executed by using the second light beam, and a third optical disc for which information recording or information reproducing is executed by using the third light beam,
the first, second and third wavelengths λ1, λ2 and λ3 satisfying conditions:

λ1<λ2<λ3; and 1.8<λ3/λ1<2.0, when protective layer thicknesses of the first, second and third optical discs are represented by t1 (mm), t2 (mm) and t3 (mm), respectively, the protective layer thicknesses satisfying a condition of t1≦t2<t3,
when numerical apertures required for information reproducing or information recording on the first, second and third optical discs are defined as NA1, NA2 and NA3, respectively, the numerical apertures satisfying a relationships: following relationships:

(NA1>NA3); and (NA2>NA3), the optical information recording/reproducing device comprising:
light sources respectively emitting the first, second and third light beams; and
an objective optical system,
wherein the objective optical system includes an optical element configured to have an annular zone structure on at least one surface of the optical element,
the annular zone structure including a plurality of annular zones configured to have at least one step formed, at a boundary between adjacent ones of the plurality of annular zones, to extend in a direction of an optical axis of the objective optical system, the at least one step being provided to cause a predetermined optical path length difference between a light beam passing through an outside of the boundary and a light beam passing through an inside of the boundary, the predetermined optical path length difference given to the first light beam by the at least one step being approximately equal to an odd multiple of the first wavelength $\lambda 1$, Abbe number of material of the optical element satisfying a condition of $15<vd<35$.

* * * * *